United States Patent
Lowans et al.

(10) Patent No.: US 9,692,595 B2
(45) Date of Patent: Jun. 27, 2017

(54) QUANTUM KEY DISTRIBUTION

(75) Inventors: Brian Sinclair Lowans, Smethwick (GB); Richard Middleton Hicks, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 220 days.

(21) Appl. No.: 13/990,230

(22) PCT Filed: Dec. 1, 2011

(86) PCT No.: PCT/GB2011/001670
§ 371 (c)(1),
(2), (4) Date: May 29, 2013

(87) PCT Pub. No.: WO2012/072983
PCT Pub. Date: Jun. 7, 2012

(65) Prior Publication Data
US 2013/0251145 A1      Sep. 26, 2013

(30) Foreign Application Priority Data

Dec. 2, 2010 (GB) .................................. 1020424.6

(51) Int. Cl.
*H04L 9/08* (2006.01)
(52) U.S. Cl.
CPC .......... *H04L 9/0858* (2013.01); *H04L 9/0838* (2013.01); *H04L 9/0852* (2013.01); *H04L 9/0855* (2013.01); *H04L 9/0891* (2013.01)
(58) Field of Classification Search
CPC ....... H04L 9/0883; H04L 9/08; H04L 9/0852; H04L 9/0855

USPC .......................................................... 380/44
See application file for complete search history.

(56) References Cited

U.S. PATENT DOCUMENTS

| 3,704,996 A | 12/1972 | Borner et al. |
| 4,291,939 A | 9/1981 | Giallorenzi et al. |
| 4,475,971 A | 10/1984 | Canterino |
| 4,691,984 A | 9/1987 | Thaniyavarn |
| 4,807,952 A | 2/1989 | Jaeger et al. |
| 4,846,540 A | 7/1989 | Kapon |

(Continued)

FOREIGN PATENT DOCUMENTS

| EP | 0 583 115 A1 | 2/1994 |
| EP | 0 610 727 A1 | 8/1994 |

(Continued)

OTHER PUBLICATIONS

US 5,150,251, 09/1992, Tomita et al. (withdrawn)

(Continued)

*Primary Examiner* — Jung Kim
*Assistant Examiner* — Ngoc D Nguyen
(74) *Attorney, Agent, or Firm* — Oliff PLC

(57) ABSTRACT

Methods and apparatus for quantum key distribution are described, in particular including methods and networks 300 arranged to improve and/or ensure the security of data transmitted thereby by (i) ensuring a certain level of loss within at least part of the network, (ii) placing a penultimate and an endpoint nodes in situated in a secure second enclave, (iii) analyzing a transmitted bit stream to ensure that it does not provide an unacceptable amount of information about the key that may be generated therefrom, and/or (iv) varying the order in which bits are used to generate a key.

5 Claims, 7 Drawing Sheets

(56) References Cited

U.S. PATENT DOCUMENTS

| | | |
|---|---|---|
| 5,150,436 A | 9/1992 | Jaeger et al. |
| 5,157,754 A | 10/1992 | Bierlein et al. |
| 5,166,991 A | 11/1992 | Jaeger et al. |
| 5,410,625 A | 4/1995 | Jenkins et al. |
| 5,414,789 A | 5/1995 | Tamil et al. |
| 5,428,698 A | 6/1995 | Jenkins et al. |
| 5,479,514 A | 12/1995 | Klonowski |
| 5,481,636 A | 1/1996 | Fukuda et al. |
| 5,566,257 A | 10/1996 | Jaeger et al. |
| 5,644,664 A | 7/1997 | Burns et al. |
| 5,732,139 A * | 3/1998 | Lo et al. .................. 380/28 |
| 5,757,912 A | 5/1998 | Blow |
| 5,768,378 A | 6/1998 | Townsend et al. |
| 5,878,142 A | 3/1999 | Caputo et al. |
| 5,999,548 A | 12/1999 | Mori et al. |
| 6,028,935 A | 2/2000 | Rarity et al. |
| 6,145,079 A | 11/2000 | Mitty et al. |
| 6,240,514 B1 | 5/2001 | Inoue et al. |
| 6,278,548 B1 | 8/2001 | Shimano et al. |
| 6,717,708 B2 | 4/2004 | Prosyk |
| 6,798,795 B2 | 9/2004 | Yoo |
| 6,806,986 B2 | 10/2004 | Asobe et al. |
| 7,068,790 B1 | 6/2006 | Elliot |
| 7,130,493 B2 | 10/2006 | Heaton et al. |
| 7,155,078 B2 | 12/2006 | Welch et al. |
| 7,162,107 B2 | 1/2007 | Bull et al. |
| 7,181,114 B2 | 2/2007 | Lee et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,327,432 B2 | 2/2008 | Skjonnemand |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,515,801 B2 | 4/2009 | McCaughan et al. |
| 7,596,318 B2 | 9/2009 | Han et al. |
| 7,627,126 B1 | 12/2009 | Pikalo et al. |
| 7,646,873 B2 | 1/2010 | Lee et al. |
| 7,706,535 B1 | 4/2010 | Pearson et al. |
| 7,760,883 B2 | 7/2010 | Kuang |
| 7,864,958 B2 | 1/2011 | Harrison et al. |
| 7,865,048 B2 | 1/2011 | McCaughan et al. |
| 8,054,976 B2 | 11/2011 | Harrison et al. |
| 8,081,270 B2 | 12/2011 | Lazarev |
| 8,488,790 B2 | 7/2013 | Wellbrock et al. |
| 2002/0025046 A1 | 2/2002 | Lin |
| 2002/0048370 A1 * | 4/2002 | Hirota .................. H04L 9/0858 380/278 |
| 2002/0060760 A1 | 5/2002 | Weiner |
| 2002/0087862 A1 | 7/2002 | Jain et al. |
| 2003/0169958 A1 | 9/2003 | Ridgway et al. |
| 2003/0210912 A1 | 11/2003 | Leuthold et al. |
| 2003/0214991 A1 | 11/2003 | Wiedmann et al. |
| 2003/0223668 A1 | 12/2003 | Breukelaar et al. |
| 2004/0032954 A1 | 2/2004 | Bonfrate et al. |
| 2004/0034776 A1 | 2/2004 | Fernando et al. |
| 2004/0086229 A1 | 5/2004 | Ahn et al. |
| 2004/0109564 A1 | 6/2004 | Cerf et al. |
| 2004/0184603 A1 | 9/2004 | Pearson et al. |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0134958 A1 | 6/2005 | Huang et al. |
| 2005/0135620 A1 | 6/2005 | Kastella et al. |
| 2005/0190921 A1 | 9/2005 | Schlafer et al. |
| 2005/0249352 A1 | 11/2005 | Choi et al. |
| 2005/0259825 A1 | 11/2005 | Trifonov |
| 2005/0286723 A1 | 12/2005 | Vig et al. |
| 2006/0002563 A1 | 1/2006 | Bussieres et al. |
| 2006/0008227 A1 | 1/2006 | Schmidt et al. |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0104592 A1 | 5/2006 | Jenkins et al. |
| 2006/0290941 A1 | 12/2006 | Kesler et al. |
| 2007/0014415 A1 | 1/2007 | Harrison et al. |
| 2007/0016534 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1 | 7/2007 | Blom et al. |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 * | 1/2008 | Tajima et al. .................. 380/278 |
| 2008/0031456 A1 | 2/2008 | Harrison et al. |
| 2008/0137858 A1 | 6/2008 | Gelfond et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 | 12/2008 | Stepanov et al. |
| 2009/0016736 A1 | 1/2009 | Beal et al. |
| 2009/0074192 A1 | 3/2009 | Beal et al. |
| 2009/0106551 A1 | 4/2009 | Boren et al. |
| 2009/0175452 A1 | 7/2009 | Gelfond et al. |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0290626 A1 | 11/2010 | Jenkins et al. |
| 2010/0293380 A1 * | 11/2010 | Wiseman et al. ............. 713/169 |
| 2010/0299526 A1 | 11/2010 | Wiseman |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 2 081 317 A2 | 7/2005 |
| EP | 1 605 287 A2 | 12/2005 |
| EP | 1 633 076 A1 | 3/2006 |
| EP | 1 643 663 A1 | 5/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-63-313120 | 12/1988 |
| JP | A-04-233518 | 8/1992 |
| JP | A-8-076148 | 3/1996 |
| JP | A-2000-295175 | 10/2000 |
| JP | A-2004-520614 | 7/2004 |
| JP | A-2005-117511 | 4/2005 |
| JP | A-2005-268958 | 9/2005 |
| JP | A-2006-013573 | 1/2006 |
| JP | A-2006-507735 | 3/2006 |
| JP | A-2006-203559 | 8/2006 |
| JP | A-2007-19789 | 1/2007 |
| JP | A-2007-500370 | 1/2007 |
| JP | A-2007-053591 | 3/2007 |
| JP | A-2007-129562 | 5/2007 |
| TW | A-2005-21509 | 7/2005 |
| WO | WO 92/11550 A1 | 7/1992 |
| WO | WO 92/11551 A1 | 7/1992 |
| WO | WO 92/11554 A1 | 7/1992 |
| WO | WO 92/11555 A1 | 7/1992 |
| WO | WO 95/07582 A1 | 3/1995 |
| WO | WO 97/44936 A1 | 11/1997 |

(56) References Cited

FOREIGN PATENT DOCUMENTS

| | | |
|---|---|---|
| WO | WO 02/15626 A1 | 2/2002 |
| WO | WO 02/057844 A1 | 7/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Feb. 19, 2014 Notice of Allowance issued in U.S. Appl. No. 12/992,695.
Fung, Chi-hang Fred et al. "Security proof of quantum key distribution with detection efficiency mismatch," Jan. 2009, pp. 131-165, vol. 9, No. 1&2, Rinton Press.
Mar. 25, 2014 Office Action issued in U.S. Appl. No. 12/863,509.
John P. Barber; Integrated hollow and solid-core waveguides for sensor platforms; Year:2005; OSA/IPRA; p. 1-3.
Apr. 7, 2014 Office Action issued in U.S. Appl. No. 12/812,849.
Apr. 11, 2013 Office Action issued in U.S. Appl. No. 13/130,944.
Apr. 20, 2010 Search Report and Written Opinion issued in International Application No. PCT/GB2009/002801.
Apr. 24, 2008 Search Report issued in International Application No. GB0801492.0.
Apr. 9, 2012 Office Action issued in Japanese Patent Application No. 2009-527883 (with translation).
Aug. 1, 2012 Office Action issued in U.S. Appl. No. 12/993,098.
Aug. 13, 2008 Search Report issued in International Application No. GB0809038.3.
Aug. 13, 2008 Search Report issued in International Application No. GB0809044.1.
Aug. 14, 2008 Search Report issued in International Application No. GB0809045.8.
Aug. 15, 2012 Office Action issued in U.S. Appl. No. 12/863,483.
Aug. 3, 2010 International Preliminary Report on Patentability issued in Application No. PCT/GB2009/000179.
Aug. 31, 2008 Search Report issued in International Application No. GB0801406.0.
Bechmann-Pasquinucci et al., "Quantum key distribution with trusted quantum relay," May 12, 2005, pp. 1-13, <http://arxiv.org/PS_cache/quant-ph/pdf/0505/0505089v1.pdf>.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett et al., "Generalized Privacy Amplification," IEEE Transactions on Information Theory, 1995, pp. 1915-1923, vol. 41, No. 6.

Bennett, "Quantum Cryptography Using Any Two Non-orthogonal States," Physical Review Letters, May 25, 1992, pp. 3121-3124, vol. 68, No. 21.
Brassard et al., "Multi-User Quantum Key Distribution Using Wavelength Division Multiplexing," pp. 1-5, XP-002534322, <http://citeseerx.ist.psu.edu/viewdoc/download?doi=10.1.1.87.378&rep=rep1&type=pdf>.
Duligall et al., "Low cost and compact quantum key distribution," New Journal of Physics 8, 249, pp. 1-16, 2006.
Elliott, "Building the quantum network," New Journal of Physics 4, pp. 46.1-46.12, 2002, XP-002271991.
Feb. 11, 2013 Notice of Allowance issued in U.S. Appl. No. 12/863,483.
Fernandez et al., "Gigahertz Clocked Quantum Key Distribution in Passive Optical Networks," Leos Summer Topical Meetings, 2006 Digest of the Quebec City, Canada, Jul. 17, 2006, pp. 36-37, XP-010940123.
Fernandez et al., "Passive Optical Network Approach to Gigahertz-Clocked Multiuser Quantum Key Distribution," Journal of Quantum Electronics, vol. 43, No. 2, pp. 130-138, Feb. 2007.
Finlayson et al., "Polarization Conversion in Passive Deep-Etched GaAs/AlGaAs Waveguides," Journal of Lightwave Technology, vol. 24, No. 3, pp. 1425-1432, Mar. 2006, XP-002459136.
Gilbert et al., "Secrecy, Computational Loads and Rates in Practical Quantum Cryptography," Algorithmica, 2002, pp. 314-339, vol. 34, US.
Gordeev et al., "Tunable electro-optic polarization modulator for quantum key distribution applicators," Optics Communications, vol. 234, pp. 203-210, 2004.
Grossard et al., "AlGaAs—GaAs Polarization Converter with Electrooptic Phase Mismatch Control," IEEE Photonics Technology Letters, vol. 13, No. 8, pp. 830-832, Aug. 2001.
Hall et al., "Optical Guiding and Electro-Optic Modulation in GaAs Epitaxial Layers," Optics Communications, vol. 1, No. 9, pp. 403-405, Apr. 1970.
Haxha et al., "Analysis of polarization conversion in AlGaAs/GaAs electrooptic polarization converter," Optics Communications, vol. 262, pp. 47-56, 2006, XP-002459135.
Heaton et al., "Optimization of Deep-Etched, Single-Mode GaAs/AlGaAs Optical Waveguides Using Controlled Leakage into the Substrate," Journal of Lightwave Technology, vol. 17, No. 2, pp. 267-281, Feb. 1999.
Horikiri et al., "Quantum key distribution with a heralded single photon source," International Quantum Electronics Conference, 2005, pp. 1617-1618, Jul. 11, 2005.
Hwang et al., "Provably Secure Three-Party Authenticated Quantum Key Distribution Protocols," IEEE Transactions on Dependable and Secure Computing, vol. 4, No. 1, pp. 71-80, Jan.-Mar. 2007.
Ibrahim et al. "Simulation of Static Optical XPM in Active MMI Couplers" (published in International Conference on Numerical Simulation of Optoelectronic Devices, Sep. 2007).
Mar. 31, 2009 International Search Report issued in International Application No. PCT/GB2009/000190.
Izuhara et al., "Low-voltage tunable TE/TM converter on ion-sliced lithium niobate thin film," Electronic Letters, vol. 39, No. 15, Jul. 24, 2003.
Jäger et al., "Modal dispersion phase matching over 7 mm length in overdamped polymeric channel waveguides," Applied Physics Letters, vol. 69, No. 27, pp. 4139-4141, Dec. 30, 1996.
Jan. 18, 2013 Office Action issued in U.S. Appl. No. 12/993,098.
Jan. 23, 2009 Search Report issued in International Application No. GB0819665.1.
Jan. 25, 2010 Search Report issued in International Application No. GB0917060.6.
Jan. 3, 2013 Office Action issued in U.S. Appl. No. 13/125,735.
Jan. 4, 2010 Search Report and Written Opinion issued in International Application No. PCT/GB2009/002745.
Jul. 14, 2009 International Search Report issued in Application No. PCT/GB2009/000189.
Jul. 14, 2009 International Search Report issued in Application No. PCT/GB2009/001223.
Jul. 14, 2009 International Search Report issued in Application No. PCT/GB2009/001226.

(56) References Cited

OTHER PUBLICATIONS

Jul. 14, 2009 Written Opinion issued in Application No. PCT/GB2009/000189.
Jul. 14, 2009 Written Opinion issued in Application No. PCT/GB2009/001223.
Jul. 14, 2009 Written Opinion issued in Application No. PCT/GB2009/001226.
Jul. 28, 2009 International Search Report issued in Application No. PCT/GB2009/000186.
Jul. 28, 2009 Written Opinion issued in Application No. PCT/GB2009/000186.
Jul. 3, 2013 Office Action issued in U.S. Appl. No. 12/993,098.
Jul. 6, 2009 International Search Report issued in Application No. PCT/GB2009/001222.
Jul. 6, 2009 Written Opinion issued in Application No. PCT/GB2009/001222.
Jul. 8, 2013 Office Action issued in U.S. Appl. No. 13/496,324.
Jun. 1, 2011 International Search Report issued in Application No. PCT/GB2010/001811.
Jun. 1, 2011 Written Opinion issued in Application No. PCT/GB2010/001811.
Jun. 11, 2013 Office Action issued in U.S. Appl. No. 12/863,509.
Jun. 19, 2013 Notice of Allowance issued in U.S. Appl. No. 12/993,146.
Jun. 2, 2009 International Search Report issued in Application No. PCT/GB2009/000179.
Jun. 2, 2009 Written Opinion issued in Application No. PCT/GB2009/000179.
Jun. 21, 2012 Office Action issued in U.S. Appl. No. 12/863,510.
Jun. 28, 2013 Office Action issued in U.S. Appl. No. 13/130,790.
Jun. 29, 2010 Search Report issued in International Application No. GB0917060.6.
Kanamori et al., "Three Party Quantum Authenticated Key Distribution with Partially Trusted Third Party," IEEE Communications Society, 2008, Globecom 2008 Proceedings.
Karlsson et al., "Authority-based user authentication in quantum key distribution," Physical Review A, vol. 62, pp. 022305-1-022305-7, 2000, XP-002534291.
Kuhn, "A Quantum Cryptographic Protocal with Detection of Compromised Server," *Quantum Information and Computation*, 2005, vol. 5, No. 7, pp. 551-560, XP-002520284.
Kumavor et al., "Comparison of four multi-user quantum key distribution schemes over passive optical networks," Proc. of Optical Fiber Communication Conference, 2004, vol. 1, pp. 205-207.
Le et al. "Enhancement of AGT Telecommunication Security using Quantum Cryptography," Ecole Nationale Superieure des Telecommunications, Eurocontrol CARE Project, QCRYPT, France.
Lee et al., "Quantum Authentication and Quantum Key Distribution Protocol," Jan. 11, 2006, pp. 1-8, <http://arxiv.org/PS_cache/quant-ph/pdf/0510/0510144v2.pdf>.
Ljunggren et al., "Authority-based user authentication in quantum key distribution", Physical Review A, vol. 62, pp. 022305-1 through 022305-7, Jul. 13, 2000; 1050-2947/2000/62(2)/022305(7).
Lütkenhaus, "Estimates for Practical Quantum Cryptography," Helsinki Institute of Physics, Feb. 1, 2008, pp. 1-26, Helsinki, Finland.
Malis et al., "Improvement of second-harmonic generation in quantum-cascade lasers with true phase matching," Applied Physics Letters, vol. 84, No. 15, pp. 2721-2723, Apr. 12, 2004.
Mar. 13, 2013 Office Action issued in U.S. Appl. No. 12/992,695.
Mar. 16, 2009 Search Report issued in International Application No. GB0822254.9.
Mar. 16, 2009 Search Report issued in International Application No. GB0822253.1.
Mar. 18, 2009 Search Report issued in International Application No. GB0822356.2.
Mar. 25, 2010 Search Report and Written Opinion issued in International Application No. PCT/GB2009/002543.
Mar. 25, 2013 Office Action issued in U.S. Appl. No. 12/310,922.
Mašanović et al., "Design and Performance of a Monolithically Integrated Widely Tunable All-Optical Wavelength Converter With Independent Phase Control," IEEE Photonics Technology Letters, vol. 196, No. 10, pp. 2299-2301, Oct. 2004.
May 10, 2013 Office Action issued in U.S. Appl. No. 13/130,897.
May 11, 2012 Office Action issued in U.S. Appl. No. 12/812,849.
May 16, 2008 Search Report issued in International Application No. GB0801408.6.
May 21, 2008 Search Report issued in International Application No. GB0801395.5.
May 21, 2008 Search Report issued in International Application No. GB0801406.0.
May 31, 2012 Search Report and Written Opinion issued in International Application No. PCT/GB2011/001670.
Menezes et al., "Handbook of Applied Cryptography," 1997, pp. 547-553, XP-002520285.
Mo et al., "Quantum key distribution network with wavelength addressing," Oct. 15, 2006, pp. 1-11, <http://arxiv.org/PS_cache/quant-ph/pdf/0610/0610096v2.pdf>, XP-002534290.
Moutzouris et al., "Second Harmonic Generation in GaAs/AlGaAs Waveguides With Femtosecond Pulses Near 1.55 μm Using Modal Phase Matching Technique," Lasers and Electro-Optics Europe, 2003 Conference Munich, Germany, Jun. 22-27, 2003, XP-010710252.
Nambu et al., "BB84 Quantum Key Distribution System based on Silica-Based Planar Lightwave Circuits," Apr. 22, 2008, pp. 1-11, <http://arxiv.org/PS_cache/quant-ph/pdf/0404/0404015.pdf>.
Nguyen et al., "802.11i Encryption Key Distribution Using Quantum Cryptography," Journal of Networks, vol. 1, No. 5, pp. 9-20, Sep./Oct. 2006, XP-002576733.
Nov. 16, 2012 Office Action issued in U.S. Appl. No. 13/130,897.
Nov. 8, 2012 Office Action issued in U.S. Appl. No. 12/863,510.
Nov. 9, 2012 Office Action issued in U.S. Appl. No. 13/130,790.
Oct. 29, 2012 Office Action issued in U.S. Appl. No. 12/993,146.
Oct. 4, 2012 Office Action issued in U.S. Appl. No. 12/992,695.
Rahmatian, "An Ultrahigh-Speed AlGaAs—GaAs Polarization Converter Using Slow-Wave Coplanar Electrodes," IEEE Photonics Technology Letters, vol. 10, No. 5, pp. 675-677, May 1998.
Rao et al., "Nonlinear frequency conversion in semiconductor optical waveguides using birefringent, modal and quasi-phase-matching techniques," Journal of Optics A: Pure and Applied Optics, vol. 6, pp. 569-584, 2004.
Rass, S., "A Method of Authentication for Quantum Networks", PWASET, vol. 12, Mar. 2006; ISSN 1307-6884, pp. 149-154.
Schlak et al., "Tunable TE/TM-Mode Converter on (001)-InP-Substrate," IEEE Photonics Technology Letters, vol. 3, No. 1, pp. 15-16, Jan. 1991.
Sep. 12, 2012 Office Action issued in U.S. Appl. No. 12/863,509.
Sep. 17, 2012 Office issued in U.S. Appl. No. 12/310,922.
Sep. 2, 2008 Search Report issued in International Application No. GB0801406.0.
Sep. 21, 2012 Office Action issued in U.S. Appl. No. 12/812,849.
Sep. 30, 2010 Search Report and Written Opinion issued in International Application No. PCT/GB2009/002802.
Stucki et al. "Quantum Key Distribution Over 67km with a Plug and Play System," New Journal of Physics 4, pp. 41.1-41.8, 2002.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
U.S. Appl. No. 12/863,483 in the name of Wiseman, filed Jul. 19, 2010.
U.S. Appl. No. 12/863,509 in the name of Jenkins, filed Jul. 19, 2010.
U.S. Appl. No. 12/992,695; in the name of Wiseman, filed Nov. 15, 2010.
U.S. Appl. No. 12/993,098; in the name of Wiseman et al., filed Nov. 17, 2010.
U.S. Appl. No. 12/993,146; in the name of Hicks, filed Nov. 17, 2010.
U.S. Appl. No. 13/125,735 in the name of Wiseman, filed Apr. 22, 2011.
U.S. Appl. No. 13/130,790 in the name of Wiseman, filed May 24, 2011.

(56) References Cited

OTHER PUBLICATIONS

U.S. Appl. No. 13/130,897 in the name of Wiseman, filed May 24, 2011.
U.S. Appl. No. 13/130,944 in the name of Benton, filed May 24, 2011.
U.S. Appl. No. 13/496,324 in the name of Ayling, filed Mar. 15, 2012.
U.S. Appl. No. 12/812,849 in the name of Wiseman, filed Jul. 14, 2010.
U.S. Appl. No. 12/863,510 in the name of Wiseman, filed Jul. 19, 2010.
Wang et al., "High Speed III-V Electooptic Waveguide Modulators at $\lambda=1.3$ μm," Journal of Lightwave Technology, vol. 6, No. 6, pp. 758-771, Jun. 1988.
Written Opinion of the International Searching Authority in International Application No. PCT/GB2009/000190; dated Mar. 31, 2009.
Yariv, "Coupled-Mode Theory for Guided-Wave Optics," IEEE Journal of Quantum Electronics, vol. QE-9, No. 9, pp. 919-933, Sep. 1973.
Yin et al., "Integrated ARROW waveguides with hollow cores," Optics Express, vol. 12, No. 12, pp. 2710-2715, Jun. 14, 2004, XP-002363659.
Apr. 30, 2013 English translation of Office Action issued in Japanese Patent Application No. 2010-543567.
Aug. 1, 2013 Office Action issued in U.S. Appl. No. 13/130,944.
Aug. 23, 2013 Notice of Allowance issued in U.S. Appl. No. 13/125,735.
Aug. 29, 2013 Office Action issued in U.S. Appl. No. 12/992,695.
Aug. 19, 2013 Corrected Notice of Allowability issued in U.S. Appl. No. 12/863,483.
Sep. 12, 2013 Office Action issued in U.S. Appl. No. 13/130,897.
Sep. 18, 2013 Office Action issued in U.S. Appl. No. 12/812,849.
Nov. 5, 2013 Office Action issued in U.S. Appl. No. 12/863,510.
Nov. 7, 2013 Office Action issued in U.S. Appl. No. 12/993,098.
Ma et al, Experimental Demonstration of an Active Quantum Key Distribution Network with Over Gbps Clock Synchronization (published in IEEE Communications Letters, vol. 11, No. 12, Dec. 2007).
Nov. 6, 2014 Office Action issued in U.S. Appl. No. 12/863,509.
Jan. 17, 2014 Notice of Allowance issued in U.S. Appl. No. 13/130,944.

\* cited by examiner

QUANTUM KEY DISTRIBUTION

FIELD OF THE INVENTION

The present invention relates to apparatus, methods, signals, and programs for a computer for quantum key distribution and systems incorporating the same.

BACKGROUND TO THE INVENTION

Encryption is commonly used to protect communications over a variety of media, especially communication networks and/or data networks. Encryption is generally based on the parties who wish to protect their communication sharing some secret value. This value may be used to derive a cryptographic key which is used to protect the communication. The more sophisticated the encryption, the harder it is to decode without the key—it is generally believed that breaking modem, well administered encryption schemes would require vast conventional computing resources. It is well known however that using the same cryptographic key repeatedly for different communications gives a possible code breaker more material to work with and potentially introduces vulnerabilities into the encryption. Therefore changing the cryptographic key often is desirable.

Distributing new key material securely is vital as, with knowledge of the key, an eavesdropper can decrypt all communications. Preferably, key distribution also is also efficient and convenient but previously used methods, for instance physical delivery of new keys by trusted courier or the like, is expensive and impractical for many situations.

Quantum key distribution (QKD) is a known technique which offers the possibility of secure key distribution. QKD relies on fundamental quantum properties and allows two parties, commonly referred to as Alice and Bob, to exchange a value and know that an eavesdropper, usually referred to as Eve, has not learnt much about the value. QKD allows key material to be securely derived by Alice and Bob as needed, which offers significant advantages over other methods of key distribution.

There are several known protocols for QKD. For example, Bennet and Brassard described a QKD protocol in C. H. Bennet and G. Brassard, "Quantum cryptography: 'Public key distribution and coin tossing'," IEE Conf. Computers Systems Signal Processing, Bangalore, India 1984 which has become known as the BB84 protocol. The BB84 protocol uses the transmission of a suitably encoded series of single photons (a quantum exchange) followed by an open discussion via any conventional communication medium (a key agreement stage) to allow Alice and Bob to derive a shared string of random numbers. As single photons are used in the quantum exchange, the only way and Eve can gain any information about this exchange is to intercept the single photons sent by Alice and measure the information herself. To avoid detection she should also transmit a photon to Bob which attempts to replicate the original photon she intercepted. Due to the random choice of encoding and the quantum mechanical properties of single photons, Eve can not guarantee to pass a correctly encoded photon to Bob and this will generate a statistical error which will be spotted by Alice and Bob during their conventional communication.

A quantum signal is any signal which may be used as the basis of a quantum key agreement protocol as would be understood by one skilled in the art. For instance the quantum signal may comprise a series of suitably modulated single photons. The skilled person will be well aware of various modulation schemes which may be used for instance, without limitation, signals based on the BB84 protocol or the B92 protocol (as described in Bennett, Charles H., 'Quantum cryptography using any two non-orthogonal states', Physical Review Letters, Vol. 68, No. 21, 25 May 1992, pp 3121-3124) or the six-state protocol or any of their variants. The modulation may for instance comprise phase, time, frequency or polarisation modulation. The quantum signal could also comprise entangled photons. For instance a source of entangled photons may generate an entangled photon pair and one of these photons may be sent across a suitable link. Thus the quantum exchange of the quantum signal may include transfer of an entangled photon. It is possible that a source of entangled photon pairs is located remotely and one photon from each pair is provided to Alice and Bob. Protocols using continuous variables and the like are also known. The bits used to make up a quantum signal are generally known as qubits.

QKD offers a secure means of distributing new key material which protects against eavesdropping. The BB84 protocol as originally described is potentially vulnerable to a so-called man-in-the-middle attack. Here an attacker, usually referred to as Mallory, positions himself so as to be able to intercept and stop all data exchanged between Alice and Bob. Mallory then communicates with Alice but pretends to Alice that he is Bob. He also communicates with Bob but in doing so pretends to be Alice. Thus each of Alice and Bob think they are talking to one another but in fact they are actually both talking to Mallory. Were simple QKD protocols to be used in this scenario, Alice would establish a quantum key, i.e. a key derived through QKD using a string of mutually agreed random photons, with Mallory (thinking it was Bob). Bob would likewise establish a quantum key with Mallory (which may be the same key, as Mallory can send a bit string based on the string agreed with Alice). Alice, thinking she had set up a quantum key with Bob, would encrypt a message meant for Bob with this key. Mallory could intercept or copy this communication, which is sent on classical channels, decrypt it and take any information he wants from the message. Communications from Bob to Alice would follow the same principle in reverse order.

To overcome the man-in-the-middle attack, it is usual for the communicating parties to undertake an authentication step to ensure that Alice is indeed talking to Bob (and Bob to Alice) and not to Mallory. Authentication usually involves revealing or using a shared secret, such as an identity key, which is known only to Bob and Alice. Alice, wishing to communicate with Bob, would attempt to contact Bob and set up a quantum key. In doing so she requests authentication based on Bob's identity key. Mallory would not know this and hence could not successfully pretend to be Bob. Similarly Bob, receiving a request to set up a quantum key with someone purporting to be Alice, would request authentication based on Alice's identity key. Authentication does require Alice and Bob to share knowledge of at least one identity key prior to commencing QKD but this key can be supplied once on initialisation of the system. In use the identity key can then be updated using a quantum key derived from an authenticated QKD session.

In summary then, QKD enables a cryptographic key to be agreed between two parties (generally known as Alice and Bob) in a manner which is designed to alert users if any information concerning the key has been intercepted by a third party (generally known as Eve or, if taking an active role and replacing messages or the like, Mallory). Information sent between Alice and Bob can be encrypted using the key according to standard cryptographic techniques.

Although the encryption is not impervious to standard attacks on encrypted information, because QKD can operate over a network, the keys can be frequently replaced and therefore any successful attack will result in limited access to communications between Alice and Bob.

QKD as described above requires an uninterrupted optical path from Alice to Bob to act as a quantum channel. This may be in free space or through an optical waveguide such as a fibre optic cable. In either case distances are limited, not least due to the use of single photons. Further, in a network having a large number of connected users it will impractical for each user to have a direct optical link with each other user.

One way of overcoming this limitation would be to have a network of nodes, such as is shown in FIG. 1. To communicate from Alice to Bob a chain of nodes is formed, each node being connected to the next node by an optical link over which QKD can be applied. In this example (although the reverse could be true) Alice would be the first node in the chain and Bob the last. In one example, each node could then establish a quantum key by QKD with its neighbours. The key established by a pair of nodes would then be used to encrypt data traffic passing between those nodes. In this way a message passing along the chain is encrypted between nodes, though a different key is used on each link. This provides protection against Eve attempting to eavesdrop on any link. However it will be clear that the data is in the clear, i.e. unencrypted, within a node and hence it is necessary to protect against Mallory pretending to be a node in the chain. This requires each node to authenticate the adjacent nodes in the chain.

Whilst such an arrangement is possible it does require Alice and Bob to trust the nodes to establish the correct path through the network and to authenticate correctly. Also it requires each node to know its own identity key and the identity keys of the previous and subsequent nodes in a chain.

Distributed Quantum Key Distribution (DQKD) describes techniques of establishing an authenticated step by step route from Alice to Bob.

Techniques for DQKD networks are described in WO2009/093037, WO2009/093036, WO2009/093034, WO2009/141586, WO2009/141587, WO2010/049673, WO2010/064004 (PCT/GB2009/002802), WO 2010/064003 (PCT/GB2009/002801) and WO 2001/039503 (PCT/GB2010/001811), all of which are incorporated herein by reference.

In one such method, as described WO2009/093036, the first and destination nodes of an optical network agree a quantum key directly using the principles of quantum key distribution, even when the first and destination nodes are linked by a network path that includes at least one intermediate node and thus may not have a direct optical link between them. The first node in the path, which may also be referred to as a source node or control node, establishes a separate quantum key with each node in the path in turn until a key is agreed with the destination node. Once a quantum key has been directly agreed with the destination node it can be used for end-to-end encryption of communications between the source and destination nodes. Note that as used herein the term 'node' means a location in the optical network which has at least one apparatus capable of transmitting and/or receiving a quantum signal suitable for quantum key distribution. A node may be an endpoint of a network or an intermediate part of the network.

This has the advantage that it allows 'Key Escrow' by a key management centre, which can be required by bodies (e.g. network management or security standards bodies) to have access to traffic keys used by participants communicating across the network.

WO2010/064004 describes how nodes can connect between two sub-networks which are managed by separate Key Management Centres (KMCs) but there is an overlap with some nodes common to each KMC. In this case, nodes not directly connected to one another can be mutually authenticated if the two KMCs cooperate or if one is a slave to the other.

Such DQKD methods create an authenticated route which aims to prevent any mis-routing by intermediate nodes along the path. Efficient networks may be developed which identify the optimum path for each signal through a network depending upon the traffic load and include routers to schedule each connection according to priorities set by a Network Management System. A full set of keys, which includes authentication and traffic keys, may be generated and managed by one or more centralised KMC.

In such QKD systems, the nodes are preferably physically secured, i.e. secure against leaking data accidentally and also in a secure location and/or protected from tampering. If any intermediate node is physically compromised, its identity can be assumed by an attacker who can transmit messages and agree a key of its choosing (or at least gain information about the key agreed). Therefore, nodes tend to be sealed in screened, tamper evident secure boxes or otherwise physically secured. Using known techniques, any successful attempt to gain access to the node itself may result in an alert being generated and the communication system may generally be shut down. In other systems, a node may transmit a status report—the content or absence of such a report may constitute an alert. In preferred systems, nodes are arranged such that, if opened, a node irretrievably deletes all keys known to it.

When the system is a Distributed QKD system, or comprises a number of relay nodes, each node should preferably be capable of transmitting a signal which can indicate that its physical security has been compromised in order for the network as a whole to be secure. The signal may be an indication that there is at least a possible security breach, or may be a signal indicating that the status is satisfactory. Without such a signal indicating that a node may be compromised, security along any path through the compromised node may be breached and this breach may continue until, for example, a physical inspection of the node is carried out.

As will be readily appreciated, the level of protection required in a network depends on the value of the information contained in that network, and therefore how much of an incentive the information provides a would-be code breaker. In assessing the necessary security level of a network, consideration may also be made of the nature of the data itself. For example, if its value is only transitory (for example, a few days) then it may be sufficient that the code in unlikely to be broken for a number of days. If however the value of the information is sustained, a network requiring more, or more sophisticated cryptographic security mechanisms (e.g., encryption algorithms, hashing functions including privacy amplification, improved physical and/or electromechanical security of nodes, etc) or the like may be required,

OBJECT OF THE INVENTION

The invention seeks to provide improved method(s) and apparatus for secure quantum key distribution.

SUMMARY OF THE INVENTION

According to a first aspect of the present invention there is provided a method of quantum key distribution, comprising a quantum exchange step and a subsequent key agreement step, wherein, in the quantum exchange step, a first quantum node and a second quantum node exchange a quantum signal over a first quantum link therebetween and wherein the first quantum node communicates with a control node such that the control node has information regarding the quantum signal exchanged in the quantum exchange step, and the control node takes the place of the first quantum node in the subsequent key agreement step, the method further comprising determining a bit loss factor corresponding to the ratio between bits exchanged in the quantum signal and the number of bits used (or intended to be used) in the key agreement step.

The method may comprise establishing a quantum key between a control node and a plurality of quantum nodes linked in series. In such examples, each of the quantum nodes (apart from the first and the last) perform the role of the first then the second quantum node in turn until an endpoint node is reached. The endpoint node may directly agree a key with the control node and communications between this endpoint node and the control node may be protected using this key. As will be readily appreciated by the skilled person, the term 'linked in series' may refer to static or transient link, i.e. the network may be fixed, variable, formed on an ad-hoc basis or the like.

As is explained in greater detail below, the presence of losses in the network mean that it is impossible for an outside entity or eavesdropper to directly determine, even if the eavesdropper has unrestricted access to the first quantum node, from a review or analysis of the bits sent, which bits are received. In addition to any loss of data as the quantum signal is passed from one node to another, losses are seen within the receiver node, and in separation of any Decoy state pulses, Sifting, Error Correction and Privacy Amplification. All of these losses can contribute to the bit loss factor.

As will be appreciated by the skilled person, it may be that an attacker in control of a node can ensure to a high level of certainty that all of the bits transmitted are received at the next node. For example, an attacker could make use of the fact that a quantum signal may transmitted by a laser via an attenuator arranged to reduce the average number of photons per pulse to a desired amount. The attacker may therefore provide a laser at the transmitting node and an attenuator at the receiving node. The high energy pulses sent over the intervening medium (e.g. optical fibre or free space) are very likely to reach the destination. The attenuator then acts to reduce the energy in the pulses. Under such a system, the contribution to the bit loss factor in transmission is negligible and therefore, in some embodiments, the bit loss factor is made up mostly of losses within the receiving node.

Advantageously the method further comprises determining if the bit loss factor meets predetermined security requirements. The method may further comprise, if the predetermined requirements are not met, enhancing the security of the network by at least one of the following: increasing the bit loss factor, hashing the bits used in establishing a key, increasing the rate at which keys are replaced, providing a plurality of paths through the network, sending portions of the quantum signal along different paths or the like. Therefore, as described in greater detail below, a bit loss factor may be determined using the number of bits exchanged in the quantum signal and the number of bits the number of bits received and available for key generation (i.e. the number of bits to be used in key agreement). In some examples, the method only continues to key agreement if predetermined security requirements are met. This ensures that the network, in use, will meet predetermined minimum security requirements. In such methods, the security of the network may be enhanced by directly increasing losses within the network (for example, including additional optical interfaces within quantum node), transmitting quantum signals comprising longer bit streams so that privacy amplification can be increased, selecting the efficiency of a node or a component thereof such that the loss rate is relatively high, or the like. Such methods may be implemented at any QKD device in the network, or at more than one QKD device in the network.

Alternatively, if the bit loss factor exceeds a predetermined level, one or more security measure in the network (e.g. privacy amplification, hashing, key replacement rate, alternative network paths, etc.) may be reduced or removed. This may simplify the network security without unduly compromising the security of the network.

It will therefore be appreciated that that, for a transmitted bit string, only a sub-portion (termed herein a substring) of that transmitted string will be received and correctly measured within the receiver and therefore be 'available' as material for key generation. Moreover, the average number of bits in the substring will be related to the number of bits in the transmitted bit stream by the bit loss factor. It will also be appreciated that the substring may be made up of any combination of the transmitted bits, with the limitation that the substring will be made up of bits taken in order from the transmitted bit stream. Or, expressed another way, the substring will be a random selection of the transmitted string. In a simple example, where the transmitted bit stream is 0001, and 2 bits are received and correctly measured, the bits may be 00 or 01. 10, however, is not a possible substring.

In one embodiment, the bit loss factor meets predetermined security requirements if the number of possible substrings (i.e. the number of different combinations of received bits which can be 'made out of' the transmitted bit string) used in key generation exceeds the number of possible keys (which may be, for example $2^{128}$, if a 128-bit key is used) which may be established in use of the network.

This is advantageous as it means that the security of the network is at least that set by the chosen encryption, i.e. the design of the network itself does not introduce an increased security risk.

It will be appreciated that, in attacking a distributed QKD system, an attacker will likely aim to attack a node as close to the end point of the chain of nodes linked in series as possible so that any information gained is most useful in determining the eventual key established between the endpoint node and the control node. In examples where there is a risk that error messages from an intermediate sub-network may not be properly transmitted to the controlling devices, such as the control node, the network may be arranged such that at least the intermediate device which is adjacent to the endpoint node is provided in a trusted sub-network, i.e. a network from which there is a higher degree of certainty that the error message will reach its intended destination.

According to a further aspect, the invention comprises a quantum key distribution network comprising a control QKD device linked in series, via at least one intermediate QKD device, with an endpoint QKD device, wherein each QKD device has at least one quantum transmitter and/or receiver arranged to exchange a quantum signal with an adjacent QKD device in a quantum exchange step, each intermediate QKD device comprising a communication unit for communicating information regarding the quantum signal exchanged with the adjacent QKD device with a communication unit at the control QKD device and the control QKD device is arranged to agree, in a key agreement step, a quantum key with each QKD device in the series in sequence, wherein the network further comprises a security monitor arranged to determine a bit loss factor corresponding to the ratio between bits exchanged in the quantum signal in at least one quantum exchange step and the number of bits used (or intended to be used) in the associated key agreement step.

The security monitor may be physically located with apparatus arranged to monitor the QKD process (i.e. the apparatus which assesses error rate as part of the standard BB84 procedure). This apparatus may therefore form part of the processing apparatus of one or each QKD device. In one embodiment, such a security monitor may be provided in the control QKD device only.

In some embodiments, there may be at least two intermediate QKD devices.

The communication unit may be a crypto-unit. The term crypto-unit as used herein means a device for encrypting communications and transmitting the encrypted communications via any conventional means and/or receiving encrypted communications and decrypting them using a cryptographic key.

As will be readily appreciated by the skilled person, the term 'linked in series' may refer to static or transient link, the, i.e. network may be fixed, variable, formed on an ad-hoc basis or the like Advantageously the security monitor may be arranged to determine if the bit loss factor meets predetermined security requirements. In such embodiments, if the predetermined requirements are not met, the security monitor may be arranged to enhance the security of the network by at least one of the following: increasing the bit loss factor, hashing the bits used in establishing a key, increasing the rate at which keys are replaced, providing a plurality of paths through the network, sending portions of the quantum signal along different paths or the like.

Alternatively, if the bit loss factor exceeds predetermined level, one or more security measure in the network (e.g. privacy amplification, hashing, key replacement rate, alternative network paths, etc.) may be reduced or removed. This may simplify the network security without unduly compromising the security of the network.

This ensures that the network, in use, will meet predetermined minimum security requirements. In such networks, the security of the network may be enhanced by directly increasing losses between QKD devices (for example switching in a longer or more lossy fibre for communications), transmitting quantum signals comprising longer bit streams and increasing privacy amplification, rejecting a node (or a component thereof) from the network unless and until its efficiency is reduced, or the like. Such losses may be implemented at any QKD device in the network, or at more than one QKD device in the network. It will also be appreciated that such security enhancement may be carried out while the network is carrying data (i.e. the network may be updated 'on the fly' to increase bit loss and/or implement further security measures) or in or prior to establishing a network.

In one aspect, the invention comprises a method of establishing a quantum key comprising monitoring a bit stream arranged to provide a quantum signal, and analysing the bit distribution of the bit stream to determine if key information available therefrom exceeds a predetermined threshold level.

As used herein, the term 'key information' refers to information available to a would-be attacker allowing him to identify, to a predetermined degree of certainty, the value and position of at least one bit in the key.

This is advantageous in securing a QKD system as it allows potential weakness in a key which is generated based on the quantum signal to be identified. A would-be attacker could use any such key information, for example to structure a brute force attack on a key generated therefrom.

The method may be a method in a distributed QKD system, for example as described above.

The method may comprise, if the predetermined threshold level is exceeded, conditioning the bit stream so as to decrease the information that may be gained from monitoring the quantum signal. This will improve the security of a key agreed as a result of transmission of the quantum signal In one example, analysing the bit stream to determine if key information is available therefrom comprises counting the number of repeated bits, i.e. counting the length of strings of consistent logic 1s or 0s, which are used (or are to be used) in key generation.

As will be appreciated by the skilled person, the bits may not be utilised in the order in which they are received. For example, a protocol may require that the bits are used in reverse order, or every even bit is used then every odd bit, or any other scheme. However, such schemes are generally public (or can be discovered), so it may be possible for the attacker to learn or guess to a high degree of certainty the value of at least one bit used in key generation if by chance the transmitted string results in a series of logic 1s (or conversely a string of logic 0s) which will be used in key generation. Therefore, the strings which are analysed are the strings which are to be used (such that e.g. in a system in which the odd bits are used are used in the order they are received, bits 1, 3, 5, 7 etc will be analysed to determine if they if key information available therefrom exceeds a predetermined threshold level).

In such an example, the predetermined threshold level may comprise a predetermined number of bits of the same value in sequence. The acceptable number of consistent bits in a row may depend on the losses in the system (the number may be higher where losses are higher, as a smaller proportion of the transmitted bits will be used), the position of the sequence in the bit string (consistent sequences in particular at the start of the string will prove useful to an attacker as an attacker can therefore determine with a high degree of certainty which bits will be received first in key generation), the acceptable level of security risk (for example, in a 128 bit key system, it may be acceptable for an attacker to learn 6 or 7 bits—the remaining brute force attack, while 'easier' in terms of time and/or resources, may provide sufficient security for the data being transmitted), or the like.

In such examples, the method may comprise, where a predetermined number of bits in a row of the same value are generated (for example by a pseudo random number generator or a random number generator), replacing a bit with a bit of the other value (e.g. if n bits of value 0 in a row are generated, the nth bit could be replaced with a bit of value 1).

In other examples, the predetermined threshold may comprise determining the proportions of bits in a sequence, wherein the sequence comprises all or a portion of the bits transmitted. In such embodiments, the bit stream may be operated on (conditioned') to replace one or more of the bits with a bit of the opposite value.

For example, if 80% of the bits in the first 100 transmitted are logic 0s, then it can be predicted with a relatively high probability that the first bit received will be a 0. Again, the level of acceptable disproportional representation of a given value in a bit stream may depend on the losses in the system, the position of a sequence having disproportional representation of bits within the bit stream, the acceptable security level or the like.

Alternatively or additionally, where the predetermined threshold level is exceeded, the key generation process may be abandoned and restarted.

In one embodiment, the method may comprise providing the order in which the transmitted bits are to be used as a secret shared between devices agreeing a key. For example, an identity key, which is shared between the devices to allow them to authenticate each other (or another shared value) may be used as a seed in a pseudorandom number generator (PRNG). The output from the PRNG could be used to control the order in which the transmitted bits are used. This ordering controlled by the PRNG could be used in place of authentication as, if the value used to seed the pseudorandom number generator is not the shared value, the keys generated by the BB84 process or the like will not be the same and any information encrypted using this key will be protected by its encryption. Further, discrepancies between 'decrypted' information and what is expected will quickly be apparent as the 'decrypted' information will not make sense. Indeed, if it can be determined with an acceptable degree of certainty that the sequence remains a secret, varying the order in which bits are used may provide an alternative to monitoring the bit stream in ensuring that key information which can be obtained from a transmitted bit stream is limited.

Therefore, in one aspect the invention comprises a QKD system comprising at least two quantum devices arranged to exchange a quantum signal comprising a plurality of bits in a quantum exchange step and at least one of the quantum devices is arranged act as a first key agreement device and to agree a key with a second key agreement device in a key agreement step, wherein each key agreement device is associated with a key determination unit arranged to determine (e.g. through communication between the key agreement devices) which bits are available for key agreement and further to determine the order in which bits are used in the key agreement step.

The term 'key agreement device' refers to any device which takes part in key agreement based on a quantum signal according to known QKD techniques. The second key agreement device may comprise a component of the other of the quantum devices which exchanged the quantum signal or may be (or comprise a component of) another device, for example a control device, which may or may not be a quantum device (i.e. capable of sending or receiving a quantum signal).

The skilled person will appreciate that in key agreement, bits are used in a predetermined sequence or order. If a bit is not received, or is not measured in the correct basis (as will be identified by both nodes following the usual classical communications used in key agreement), the next bit in the sequence is used. Therefore, it may be established that a string of 5 bits should be used in the order 3, 2, 5, 4, 1 but, if bit 1 is not received, and bit 5 is received and measured, but not measured in the basis in which it is encoded (but all other bits are successfully received and are measured in the base in which they were encoded), the sequence of bits used for key generation is 3, 2, 4. Of course, quantum key agreement generally occurs with strings of much greater length than the 5 bit sequence above, which is provided solely by way of illustration of the principle.

In known QKD systems, the order in which bits are used is predetermined and is static. Often, the order comprises part of a public protocol. According to this aspect of the invention, the order in which bits are used is determined by the key determination unit (which may be collocated with one, a plurality or each key agreement device or remote but connected thereto (and perhaps associated with more than one key agreement device). This allows the order to be a shared secret between key agreement devices and therefore contributes to security: not only is the risk of transmitting an inadvertently revealing bit stream removed or reduced (as, if the order is not known, a would-be attacker will not know which bits are revealing), but in preferred embodiments, the order may be changed from time to time such that in the event a sequence becomes known, the time for which it is useful is limited. Further, as it is a shared secret, it can be used as additional verification between the key agreement devices, or indeed replace other authentication methods as outlined above.

In some embodiments the order is determined prior to each key agreement.

In a preferred embodiment, the key determination unit(s) associated with each key agreement device comprises a pseudorandom number generator (PRNG). Each key agreement device may have an associated PRNG, where the PRNGs are equivalent.

In preferred embodiments, the key agreement devices are arranged to store a shared value and the shared value is used as the seed for the pseudorandom number generator(s). The shared value may comprise an identity key. Shared values may be distributed as is familiar from known QKD techniques to update identity keys, session keys, traffic keys, or the like. A new order for use of the received bits may be determined every time a quantum exchange takes place or less frequently.

According to a further aspect of the invention, there is provided a method of Quantum Key Distribution comprising a quantum exchange step in which a quantum signal comprising a number of bits is exchanged between at least two quantum devices and a key agreement step in which at least a portion of the bits of the quantum signal which have a value that is known to at least two key agreement devices are used to determine a key known to both devices, the method further comprising the step of determining the order in which bits are used in the key agreement step.

In some embodiments the order is determined prior to each key agreement. The order may be determined based on information exchanged in the quantum signal. In some embodiments, the quantum signal is exchanged between the same two devices as establish the key (i.e. the key agreement devices are the quantum devices), but this need not be the case—the quantum signal may for example be exchanged between two quantum devices and a key agreed between one of those quantum devices and a separate control device (which may or may not be a quantum device itself.

In a preferred embodiment, the order is determined by at least one pseudorandom number generator (PRNG) (the output of which may, for example, be encrypted and sent from one key agreement device to another, e.g. using a previously established key, or may be encrypted and sent from one device to both of the key agreement devices) and more preferably by equivalent PRNGs associated each of which is associated with a key agreement device. The PRNGs may be seeded with a shared value, which may comprise an identity key. Shared values may be distributed as is familiar from known QKD techniques to update identity keys, session keys, traffic keys, or the like.

The step of determining the order in which bits are used in the key agreement step may be carried out every time a quantum exchange takes place or less frequently.

In one aspect, the invention comprises a quantum transmitter unit, the quantum transmitter unit comprising a pseudo random number generator (PRNG) arranged to generate a bit string and a quantum encoder arranged to encode qubits with a bit stream for transmission over quantum communication media, the unit further comprising a bit stream analysis unit arranged to monitor the output of the PRNG and to determine key information which may be obtained from analysis of the bit stream.

In one embodiment, the quantum transmitter unit comprises a communication unit arranged to receive a seed for the PRNG. This seed may be transmitted from a Key Management Centre or other control unit, and may be used by the PRNG to generate a string of bits.

The bit stream analysis unit may be arranged, if the available key information exceeds a predetermined level, to control a bit stream conditioning unit to condition the bit stream by changing the value of one or more bits. In other embodiments, the bit stream analysis unit may be arranged to terminate a transmission and the communication unit may request a new seed.

According to another aspect of the invention, there is provided a pseudo random number generator for use in a quantum key distribution system, the pseudo random number generator comprising a bit stream analysis unit. The bit stream analysis unit may have any of the features described in relation to the bit stream analysis unit above.

The invention also provides for a system for the purposes of communications which comprises one or more instances of apparatus embodying the present invention, together with other additional apparatus.

The invention is also directed to methods by which the described apparatus operates and including method steps for carrying out every function of the apparatus.

The invention also provides for computer software in a machine-readable form and arranged, in operation, to carry out every function of the apparatus and/or methods.

The invention is also directed to signals employed by the other aspects of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Some embodiments of the invention utilise a distributed or serial QKD model to improve downstream security. In traditional QKD, data hops between adjacent nodes. If access to a node can be obtained, it is possible to understand all of the information going through a network and therefore break network security.

Known QKD systems rely on physical security to ensure that access to a node cannot be obtained or, if the physical security of the node has been compromised, an error message is generated indicating that the security had been compromised (or in some systems, a node will generally transmit a message indicating that its security is not compromised, and the absence of such a message provides an alert). However, it may the case that not all the nodes are under the control of a trusted organisation. In particular, it may be that in practical embodiments, one or more of the intermediate nodes are provided by an entity or organisation which cannot be trusted to forward any such generated error messages. For example, in real networks, a message may need to be passed securely from one trusted sub-network, or Enclave to a second trusted sub-network, by passing through an uncontrolled intermediate network that is managed and authenticated by a third party (who may not be completely trusted). In this example, security alerts to the Network Management System operating in the Enclaves may not be transmitted (e.g. blocked), or the contents thereof may be altered.

Therefore, it cannot always be assumed the anti-tamper security for each node will raise an alarm (or else that regular inspection would be cost effective and/or sufficient to detect any physical tampering attempts to compromise or take over a node).

In DQKD as described, for example, in our previous application WO2009/093036, it has previously been assumed that limited useful information could be obtained because keys were not relayed through a node to subsequent nodes. However, new insight has shown that if Mallory does control a node or can read all of the internal messaging of the node then a security problem exists in relation to the security of the network paths which pass through such a node in a downstream direction (i.e. information passed from that node onwards is at risk), because the information gained at one node provides an insight into the quantum signal exchanged with the next node.

However, appropriate network design can be used to limit the amount of information that can be gained even if a node has been physically compromised, as is now explained.

Figure 1:
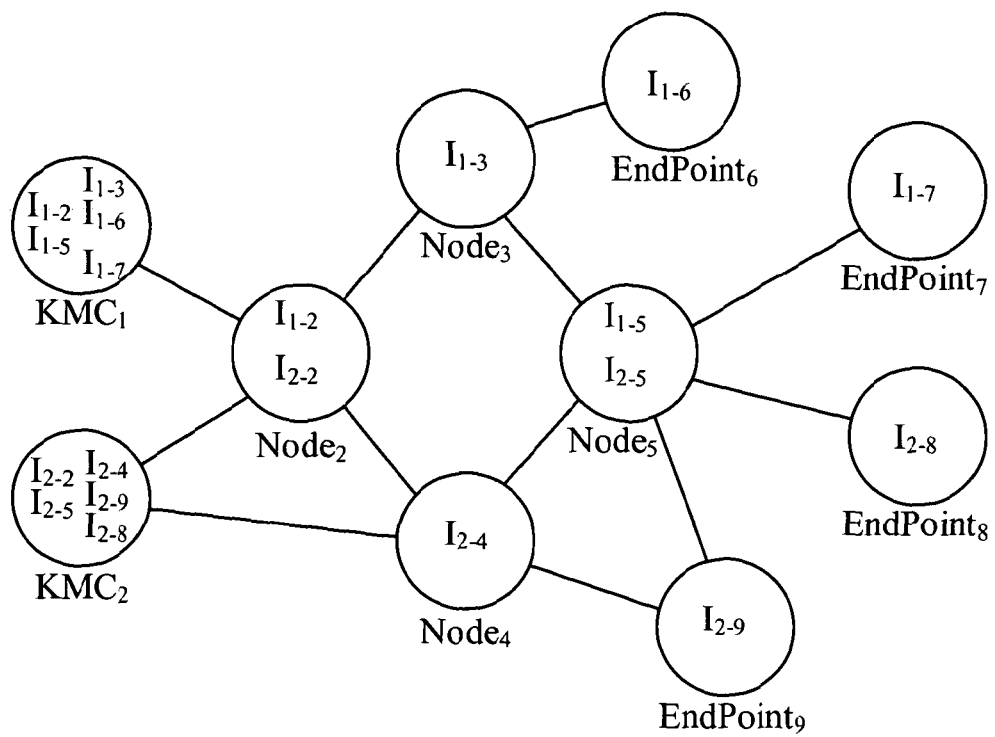
FIG. 1 shows an example of a Distributed QKD network.

As is described in greater detail in, for example, WO2010/064003, FIG. 1 shows a network for performing quantum cryptography, in this particular case for passing encrypted messages from either of two starting nodes (Key Management Centres, (KMCs)) $KMC_1$, $KMC_2$ to any of four end-point nodes $EndPoint_6$, $EndPoint_7$, $EndPoint_8$, $EndPoint_9$ via intermediate nodes $Node_{2-5}$. A traffic key is used for encryption of data passed between end-point nodes; this key is supplied from the KMC to each end-point node in a form encrypted using a quantum key agreed between the KMC and the end-point node. This quantum key may be established by a process in which respective quantum keys are agreed in series between the KMC which acts a control QKD device and every other node (intermediate QKD devices) in a path between the KMC and the end-point node. For example, in order to establish a quantum key between $KMC_1$ and $EndPoint_6$, a quantum key is first are established between $KMC_1$ and $Node_2$, between $KMC_1$ and $Node_3$ and finally between $KMC_1$ and $EndPoint_6$. In one example, in order to establish a quantum key between a KMC and a given node in a path between that KMC and an end-point node, a quantum signal may be passed between a given node and the previous node in the path, and the information in that quantum signal passed from the previous node to the KMC using a quantum key established between the previous node and the KMC. A key agreement step may then take place between the given node and the KMC to establish a quantum key between these two nodes.

To consider a stage in this process in greater detail, when the quantum key is established between $KMC_1$ and $Node_3$, a quantum exchange step is followed by a key agreement step. In the quantum exchange step, $Node_2$ (acting as a first quantum node) exchanges a quantum signal over a quantum link with $Node_3$ (acting as a second quantum node). The first quantum node, $Node_2$, communicates with $KMC_1$ (acting as a control node) to share information regarding the quantum signal transmitted by $Node_2$. It is then the $KMC_1$, rather than $Node_2$, which takes part in the subsequent key agreement step with $Node_3$.

This stepwise approach to establishing a quantum key between a KMC and an end-point node overcomes the problem that the distance between adjacent nodes in the network is limited by practical considerations relating to the maximum distance over which a quantum signal may be sent.

The establishment of a quantum key between any two nodes usually also involves an authentication step using an authentication key shared between the two nodes. The number of authentication keys that must be stored by a general node in the network may be limited by only allowing certain nodes—in this example the KMCs—to act as starting nodes, i.e. nodes from which encrypted messages may be sent to end-nodes.

Figure 2:
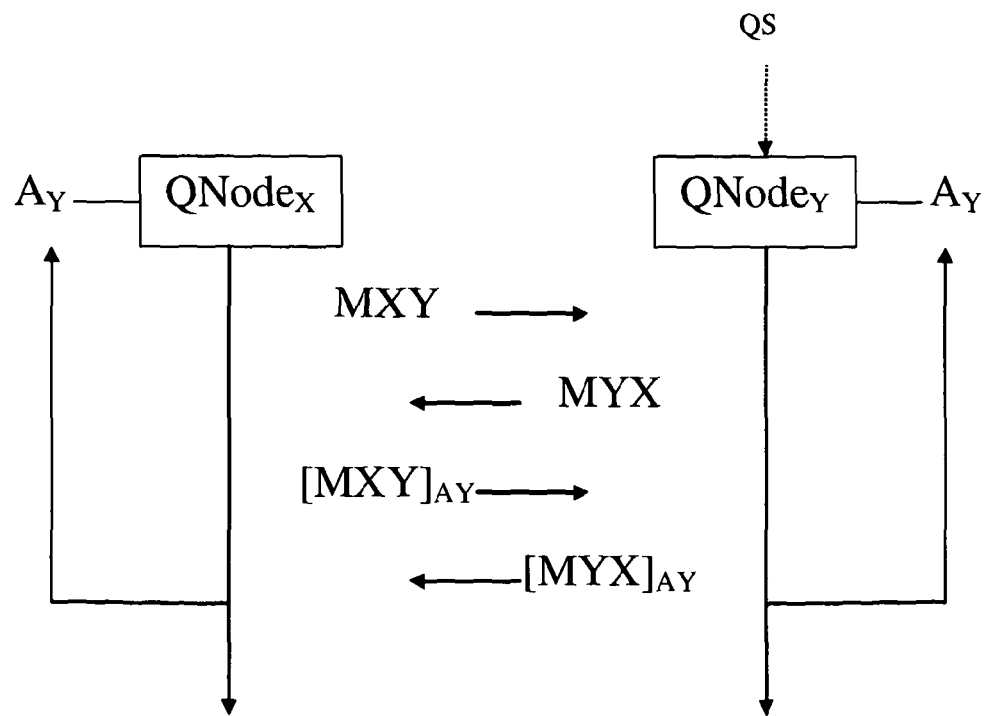
FIG. 2 schematically shows cross authentication between nodes.

FIG. 2 illustrates prior art steps in the establishment of a quantum key between two network nodes, for example between $KMC_1$ and $Node_3$ in the network of FIG. 1, and in particular illustrates a process of cross authentication. In FIG. 2, the two nodes are labelled $Node_X$ and $Node_Y$ and perform the roles ascribed to $KMC_1$ and $Node_3$ in the above example respectively. $Node_Y$ receives a quantum signal QS based on a bit stream which is known to (but, in the embodiments described herein, not sent always from) $Node_X$. $Node_X$ and $Node_Y$ then exchange messages MXY, MYX over a classical channel in a key agreement step, i.e. a step in which the quantum key is agreed. Finally, before that quantum key can be used, each of $Node_X$ and $Node_Y$ must each prove its identity to the other in an authentication step. In the authentication step, each of the nodes $Node_X$, $Node_Y$ passes to the other a cryptographic hash using the authentication key of a message MYX it passed to the other node in the key agreement step, the cryptographic hash being generated by mean of an authentication key AY which is a 'shared secret' between the two nodes $Node_X$, $Node_Y$. In FIG. 2 the cryptographic hashes are denoted $[MXY]_{AY}$ and $[MYX]_{AY}$. Each node compares the hash it receives from the other node with a locally generated equivalent, thus confirming the identity of the other node, hence protecting against a so-called 'man-in-the-middle attack'. The whole or part of the quantum key established between the nodes $Node_X$, $Node_Y$ may be used to generate or update the authentication key AY shared by the two nodes.

Referring again to FIG. 1, $KMC_1$ shares authentication keys $I_{1-2}$, $I_{1-3}$, $I_{1-5}$, $I_{1-6}$, $I_{1-7}$ with $Node_2$, $Node_3$, $Node_5$, $EndPoint_6$ and $EndPoint_7$ respectively. A quantum key may therefore be agreed between $KMC_1$ and any one of these intermediate nodes and end-nodes. The quantum key may be changed to improve security. A new quantum key may be used to update a shared authentication key. Similarly, $KMC_2$ shares authentication keys $I_{2-2}$, $I_{2-4}$, $I_{2-5}$, $I_{2-8}$ and $I_{2-9}$ with $Node_2$, $Node_4$, $Node_5$, $EndPoint_6$ and $EndPoint_8$ and $EndPoint_9$ respectively.

Methods of improving and ensuring the security of Distributed QKD networks are now described with reference to FIG. 3.

It is generally assumed that Mallory's attacks are intended to be covert (but it should also be remembered that Mallory could use an overt attack, for example to divert network traffic to a node over which Mallory has control, or to prevent increased security measures such as splitting of a key).

Figure 3:
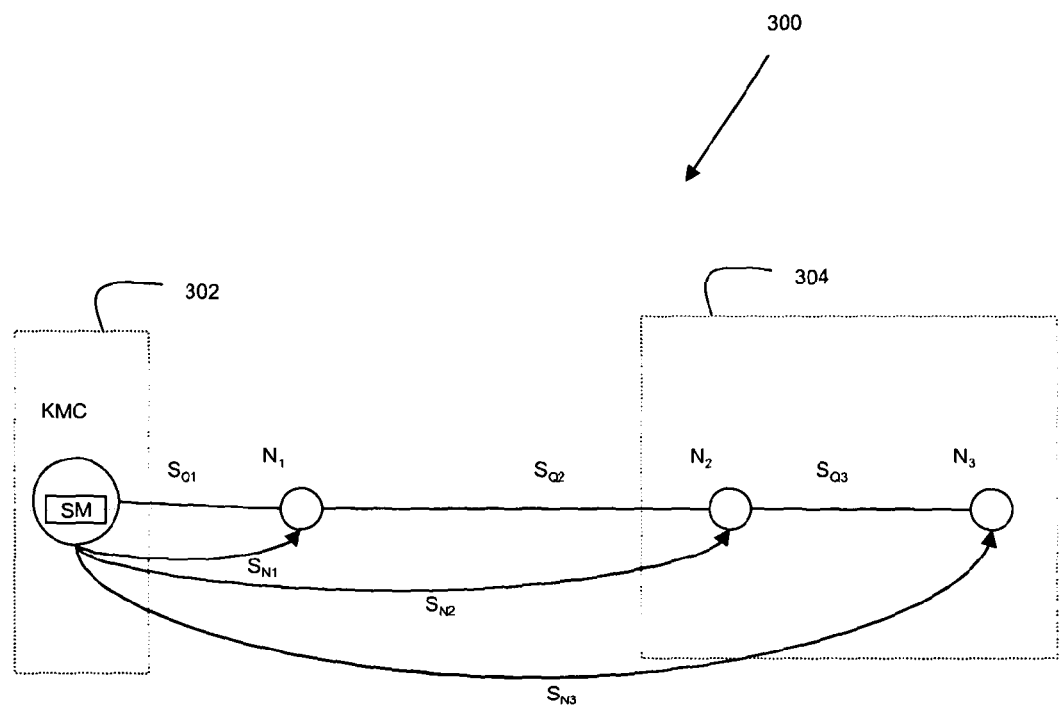
FIG. 3 shows an example of a network comprising a number of enclaves.

FIG. 3 shows a network 300 in which a Key Management centre KMC, acting as a control QKD device, wishes to set up a secure communication with a given end point device, designated $N_3$ herein. There are two intermediate QKD devices $N_1$ and $N_2$. As has been described in greater detail in our earlier applications (e.g. WO2009/093034), in order to establish the key between the KMC and $N_3$, the KMC transmits a quantum signal $S_{Q1}$ to $N_1$ then agrees a quantum key with $N_1$ using classical communication $S_{N1}$, and the KMC and $N_1$ carry out mutual authentication. $N_1$ then sends a quantum signal $S_{Q2}$ to $N_2$. $N_1$ and the KMC exchange information about this signal. It may be that $N_1$ provides the KMC with information about the quantum signal. This may be information indicative of the signal itself (i.e. the full bit stream) or it may be a 'starting point' or seed for a pseudo random number generator (wherein both $N_1$ and KMC contain equivalent pseudo random number generators). The quantum string to be sent by $N_1$ to $N_2$ can alternatively have been prescribed by the KMC, which may for example send a pseudo random number generator seed or full bit stream to $N_1$ (i.e. the information exchange can be from $N_1$ to KMC or from KMC to $N_1$, or indeed the bit stream may be sent in whole or as a seed from a third entity—other options are also possible, for example as described in our earlier applications identified above). The information exchanged may be encrypted using the key agreed between KMC and $N_1$, and ensures that the KMC has sufficient information to agree a quantum key direct with $N_2$ (and not via $N_1$), using classical signals $S_{N2}$. $N_2$ and the KMC may then mutually authenticate. $N_2$ then sends a quantum signal $S_{Q3}$ to $N_3$ and exchanges information about this quantum signal with the KMC encrypted using the key agreed between KMC and $N_2$, and the KMC can then directly agree a quantum key with $N_3$ over classical channels in communication $S_{N3}$.

Other methods of establishing a key in a distributed network will be familiar to the skilled person and could be used in place of the method outlined above as appropriate In the security enhanced network 300 now described as an embodiment of the present invention, the KMC is in a physically secure location in a trusted sub-network provided by a first enclave 302. The end node, $N_3$ is in a separate physically secure location in a trusted sub-network provided by a provided by a second enclave 304. However, in order to reach $N_3$, the communication must pass through at least one node, $N_1$, in an uncontrolled sub-network, i.e. region in which the physical security of the node $N_1$ cannot be ensured and/or it cannot be safely assumed that any alarm raised at $N_3$ will reach the KMC.

The network 300 is arranged to improve the security of data transmitted thereby in a number of ways, which can be used independently or in combination, and which may be used in conjunction with existing security measures such as hashing, privacy amplification, and the like. These methods include ensuring a certain level of loss within at least part of the network 300. Further, in this example, the penultimate and the endpoint nodes are situated in a secure second enclave 304. Other methods include analysing a transmitted bit stream to ensure that it does not provide an unacceptable amount of information about the key that may be generated therefrom and/or varying the order in which bits are used to generate a key. Such methods are described in greater detail below.

The role of losses in the network 300 in improving security is now described.

Conceptually, in some embodiments of QKD, a stream of photons is sent between nodes, each photon representing a single bit of data. However, because in practice it is technically difficult to produce single photon sources, QKD systems often use a heavily attenuated laser. A laser in combination with an attenuator may be arranged to emit pulses so that on average less than 1 photon is seen in each pulse. This is designated as $\mu<1$. A typical value of $\mu$ might be 0.1, i.e. for every 10 pulses, on average, approximately 9 have no photons and 1 contains a photon, although it is not known which pulses contain photon(s).

To be more precise, the number of photons per pulse corresponds to the Poisson distribution. For $\mu=0.1$, on average, around 90.5% of pulses are empty, 9.05% of pulses have 1 photon, 0.45% of pulses have 2 photons, 0.015% have 3 photons, and so on. In known security attacks, Mallory may use the knowledge that some pulses have more than 1 photon and use these multiple photon pulses to obtain information.

Where losses in the system are high enough (above a threshold value) this means that the security as defined in the protocols can be circumvented. In effect, the attacker can "hide in the losses", stopping all single photon pulses and transmitting multi photon pulses to the receiver. The way of detecting such an attack is to use a Decoy state. In such states, typically 2 or 3 different values of $\mu$ are used (i.e. $\mu$ is selected from one of 2 or 3 values predetermined values). For example, $\mu$ might at one time be 0, at another time be 0.1 and at a third time be 0.5. The value is randomly changed for each pulse. The value of p is exchanged as part of the checking messaging protocol following transmission of the bit. If the pulses have been intercepted, the statistics will not match.

Due to losses in transmission, for a given random string transmitted, only a portion of that string reaches the receiver. Further, bits are lost within the receiver or measured in an incorrect basis and excluded in sifting, or lost in privacy amplification or the like. As a result, only a subset of the string sent is available for use in key generation. Although it cannot be known in advance which bits will be lost in the transmission, it is known that the substring available for key generation will be a string of bits in the same order as those appeared in the transmitted string. The number of possible such sub-strings that can be derived from a given transmitted string may be calculated using probability theory.

If the original transmitted string is designated $S_{Q2}$ and the losses are a random process which results in a random sub-string of bits $S'_{Q2}$, in terms of probability theory the sub-string $S'_{Q2}$ can have many different random selections of the bit sequence. The number of random selections of a string of bits can be represented by using the probability theory of combinations.

$$^{S_{Q2}}C_{S'_{Q2}} = \frac{S_{Q2}!}{(S_{Q2} - S'_{Q2})! \times (S'_{Q2})!}$$

Selecting or ensuring a certain level of loss within the network 300 and/or at least one receiving node introduces a further level of security into the system. Even if a given node, e.g. $N_1$, is compromised, and an attacker knows the full quantum string $S_{Q2}$ sent to $N_2$, it does not know and, as is demonstrated more fully with reference to typical loses below, would be extremely unlikely to correctly guess which of those bits are received and measured using the correct basis. In traditional QKD, this would not present a problem to a would-be attacker in control of $N_1$ as $N_2$ would immediately tell $N_1$ which bits had been received. However, as described above, $N_2$ here communicates with the KMC via a classic communication channel using signal $S_{N2}$ and therefore, in order to obtain this information, an attacker would have to intercept the traffic $S_{N2}$ from $N_2$ to KMC, which is encrypted in this example using symmetric encryption, and decrypt it.

The chance of correctly guessing which bits are available for key generation can be calculated as outlined below, using a slightly idealised situation utilising an anticipated loss of 3 dB (i.e. roughly half the transmitted bits, which is the minimum anticipated loss in BB84 protocol systems as the apparatus will, on average, measure 50% of the bits using the wrong basis, and these bits will be removed by the sifting process). In practice losses of 30 dB (a bit loss factor of $\frac{1}{1,000}$) may be seen (in particular if transmission losses are taken into account). Even in a carefully produced QKD receiver using current technology, there would be expected losses of 10 dB within the receiver itself. As noted above, it may be only the losses within node that are controlled due to the concern that an eavesdropper might situate an attenuator just outside the receiving node and therefore know to high degree of certainty what bits have been received.

If tens of megabits of pulses are sent, at $\mu=0.1$, approximately $\frac{1}{10}^{th}$ of these pulses will include a photon. Taking the example of a transmission of 100,000,000 pulses, with $\mu=0.1$, (i.e. $\frac{1}{10}^{th}$ of these pulses will include a photon), this will result in the transmission of approximately 10,000,000 bits (it will be appreciated that the attenuation processes are statistical, therefore the number of bits may actually be more or less than 10,000,000). A loss of 30 dB means a reduction by a factor of approximately 1,000, i.e. there will be approximately 10,000 bits received. This can be expressed in terms of combination theory as $^{100,000,000}c_{1,000}$ or if the attacker is able to detect which pulse has a photon in it, $^{10,000,000}c_{10,000}$. This is a very large number. Even assuming a scenario where the losses are only 3 dB and assuming the original string length is only 1000 bits (again much lower than is usual in practice) this probability is shown below (in which, again, all numbers are approximate).

$$^{S_{Q2}}C_{S'_{Q2}} \approx \frac{(1 \times 10^3)!}{(1 \times 10^3 - 0.5 \times 10^3)! \times (0.5 \times 10^3)!}$$

$$\approx \frac{(1 \times 10^3)!}{(500)! \times (500)!}$$

$$\approx \frac{4 \times 10^{2567}}{1.5 \times 10^{2268}}$$

$$\approx 2.7 \times 10^{299}$$

A combination of losses along the fibre (and through optical network components) combined with losses within the QKD receiver (in e.g. $N_2$) and combined with losses due to application of decoy states and of QKD protocols may combine to create very large losses (typically >30 dB)

assuming a fibre distance of about 80-100 km and current technology. At least 10 dB losses might be anticipated even if only the losses in the receiver are taken into account. Further, this simple example assumes approx 500 bits form the sequence $S'_{Q2}$ (note half of these represent different Decoy states) but in practice a much larger string will be sent, which would make the number of selections of 500 bits even larger and in practice the number of combinations may be made many times larger.

The received string of random bits remains to form the Key material from which a session key is established. Authentication can be completed, for example by employing a suitable hash of the full messaging sequence using a previously established authentication key as described above (or it may be done at multiple occasions during the message process).

If Mallory is to mount a successful covert attack on $N_1$ (or in more general terms, any node in an uncontrolled portion of the network 300), the anti-tamper measures of $N_1$ must be broken without raising a network security alert, or at least without the security alert reaching the KMC. If this is achieved however, it may be assumed that Mallory is able to monitor all traffic in and out and can alter traffic if he so chooses. For the sake of simplicity, in this example, Mallory does not carry out any other attacks on other nodes.

In this example, and purely by way of example, Mallory knows the full content of the random string $S_{Q2}$ sent to $N_1$ and encrypted by the KMC. Mallory therefore knows the values used for the Decoy state. Mallory also knows the random bases for the quantum signal that are be sent to $N_2$. Since in this embodiment a QKD Decoy state is employed, this means that $N_2$ will be able to detect any variation in the statistics if Mallory attempts to alter the probability of any pulses reaching $N_2$ (i.e. changed some bits so that it could determine at least a portion of the bits received) as this would introduce errors which will take the error checking above the threshold and result in an alert to the effect that the network 300 has been broken. It is assumed herein that Mallory has no prior information on the previously established authentication keys between KMC and $N_2$ which means that the subsequent QKD protocol messaging between KMC and $N_2$ is protected by unbroken encryption. KMC and $N_2$ are able to confirm the final string $S'_{Q2}$ which is shorter than the transmitted string $S_{Q2}$ and is unknown at this stage to Mallory.

The network 300 in this example is arranged such that the 'bit loss factor' for $S_{Q2}$ is sufficiently high than the number of possible sub strings is higher than the number of key combinations (e.g. $2^{128}$), although other levels may be appropriate depending on the information to be protected by the agreed key. The bit loss factor can be ensured by the design of $N_2$ (choice of optical components, or choice or length of fibres, for example), use of 'throwing away' algorithms, privacy amplification, or the like.

However, in other examples, the bit loss factor within $N_2$ (remembering that in some examples, were there is a risk that an eavesdropper may know all the bits received at $N_2$, and therefore losses in transmission may be ignored), may approach the theoretical minimum of 50%, for example using superconducting components.

In this embodiment, the network 300 is arranged such that a maximum of $1/10^{th}$ of the bits transmitted from $N_1$ to $N_2$ are used in agreeing the Quantum key. In this example, the KMC comprises a security manager SM arranged to calculate a ratio of the bits received and available for use in key generation (this information will become available to the KMC in the usual key agreement communications between the KMC and $N_2$) to the number of bits transmitted (which is known from the communications between $N_1$ and KMC). If the Security Manager SM determines that more than 1 in 10 bits are used, then the attempt to establish a key with $N_2$ is abandoned. The KMC instructs $N_1$ to send a new, longer, bit stream to $N_2$ as a quantum signal, and further instructs N2 to employ a higher level of security amplification (which results in a greater degree of bit losses through hashing). For convenience, the SM may also carry out the standard security checks used in QKD, such as checking the error rate to determine if eavesdropping has occurred, although it could be a standalone processing system.

Other example bit loss factors may be ⅕, 1/100, 1/1000 or the like.

Further, $N_2$ and $N_3$ are situated in a protected enclave 304 and there can be confidence that any alert generated by the nodes within the protected enclave 304 will reach the KMC. This means that the network has integrity; i.e., in the absence of the alert generated at $N_2/N_3$, a user can be reasonably confident that the network has not been successfully tampered with. Of course, an attacker might also act to intercept such messages so in some examples, the nodes may send 'status' messages, indicating that no attacks are apparent—the absence of such a message could therefore constitute an alert. It will also be appreciated that in this example, the messages are sent to the KMC but they may instead be sent to some separate network management device, which may be co-located with, or separate from, the KMC.

As shown above, Mallory cannot easily guess the bit values used for any keys because the number of variations is so large. In fact, the number of variations is many times greater than for a symmetric encryption key, so it is easier for Mallory to brute force the, for example, 128 bit symmetric encryption key used in the network to guess the session key used by the KMC to the nodes.

If Mallory tries to gain more information by changing the sequence $S_{Q2}$ he will be detected because the Error Correction process between the KMC and $N_2$ performs a natural integrity check on both the Decoy states used and also on the bit sequence. This forces Mallory to use only the information constrained within the natural network error rate otherwise his presence will immediately be detected, and this information may be removed by the subsequent QKD protocol.

Further, even if Mallory does somehow gain information on the bit sequence (e.g. a few bits), this embodiment further comprises a Privacy Amplification step prior to key generation which hashes the bit sequence to produce a shorter string. Since bits are XOR'd in a way agreed only between KMC and $N_2$ (remembering that in this scenario, Mallory has access to $N_1$ only) it is irreversible. Therefore if it is known that other plaintext attacks or other combinational attacks reveal a theoretical information level to Mallory this is inherently removed by an appropriate level of hashing. Therefore, the security of the system can be further enhanced by selecting the level of privacy amplification according to the error rate.

Mallory could attack nodes downstream of $N_1$ in the network—there could be other unprotected nodes between $N_1$ and $N_2$. Assuming the KMC is secure, Mallory has no information about the information exchanges between any nodes between $N_1$ and the KMC or along parallel paths.

It is possible that a number of nodes might be compromised, or even a sub-network. As the end-to-end encryption key is determined at the final step, Mallory may attempt to attack the final node or a node that is close to the final node. Therefore, the importance of the physical security of the nodes (and their ability to raise an alert when tampered with) increases the further down the chain. For this reason, in this embodiment, the network is designed such that the penultimate node and endpoint node are within a trusted enclave 304, which means that the classically enhanced QKD security is re-established although now the remote possibility of the downstream security is at risk, as is now described in greater detail.

Even if Mallory is somehow able to guess or learn the session encryption key used between the KMC and $N_1$, by a brute force attack or some other means, and can also intercept the messages then there is a very small window of time to learn the string sent to the next node $N_2$ from $N_1$. As noted above, where losses are high, this may not provide sufficient information in itself, but is losses are low (or if, as is discussed below, a bit string is sent which allows at least a portion of the key to guessed), then Mallory may be able to determine the key set up between $N_3$ and the KMC, and therefore learn the bit string sent to $N_3$. There is therefore a limited but possible situation that the chain of downstream security is at risk before the KMC follows another round to update all encryption keys with those exposed nodes. In other words, although the downstream security is not perfect, the refresh rate of Key Distribution has to be considered. This limits the amount of time for which access to any information is valid. Not only does the network have to be broken, it has to be repeatedly broken. Therefore, the refresh rate may be set according to the error rate.

As noted above, in this example $N_2$ and $N_3$ are in a protected enclave 304. Therefore, there is a higher degree of certainty that any alerts generated by these nodes will reach the KMC.

Further, there may be a higher degree of confidence in the physical security of these nodes. One or both of these measures allows a higher degree of certainty that Mallory is not able to gain (covert) control of these nodes.

As with other distributed networks, a denial of service attack can be prevented by providing alternative routes through the network 300. Also the diversity of paths provided mean that all possible paths would have to be broken in order that the eavesdropper could ensure that it had access to all information being passed through the network 300. Therefore, the ideas discussed herein may be used in conjunction with known systems which split keys and send key portions by different routes. However, there is the risk that a denial of service type attack could be used with the real motivation of diverting traffic via a compromised node and/or ensure that all network traffic must pass along one or a few paths.

Figure 4:
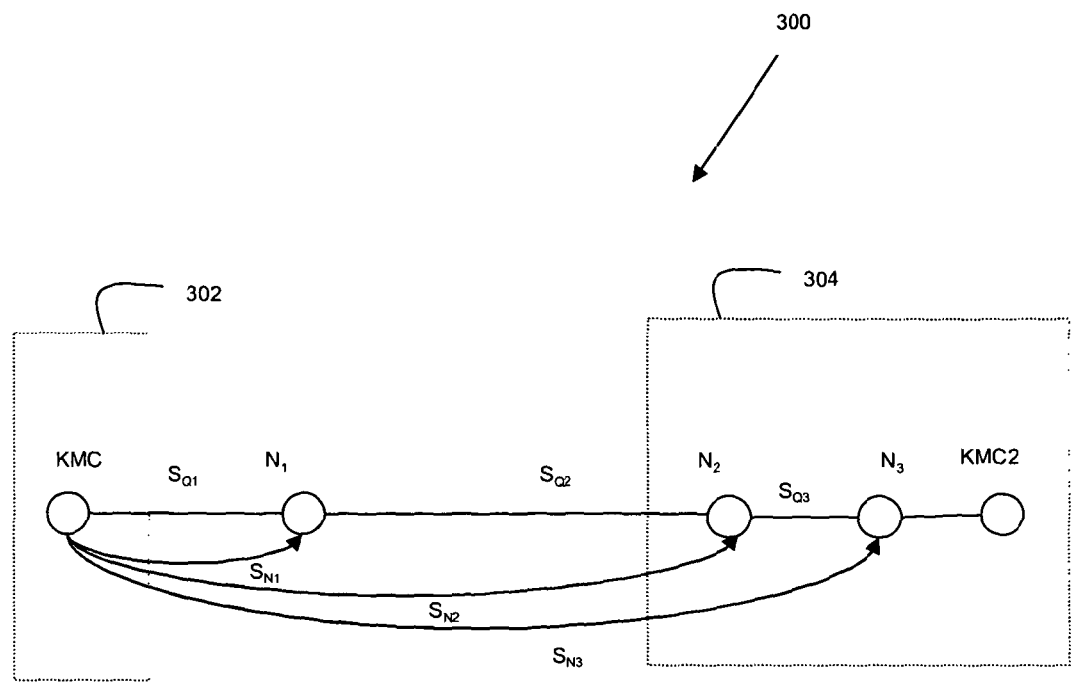
FIG. 4 shows a further example of a network comprising a number of enclaves.

FIG. 4 shows an example of a network 400 in which, in contrast to the network 300 of FIG. 3, the second enclave 304 has a separate KMC, $KMC_2$. In this example, $KMC_2$ is a slave of $KMC_1$ but in other examples it may be an independent and trusted by the end-users.

In such a network 400 is possible to strengthen security by introducing a set of keys updated from either KMC. In the example of FIG. 4, the nodes $N_2$ and $N_3$ have key sets that can be updated by $KMC_2$ and also by $KMC_1$ (by a cross-authentication process). Therefore both KMCs will share the authentication keys for these nodes.

Normally when $N_2$ authenticates to $KMC_1$ it may for example form a cryptographic hash of the whole message set during the messaging process to establish a new key set. Now it can double encrypt with an authentication key from $KMC_1$ and $KMC_2$. To avoid re-using this key it can be updated frequently by $KMC_2$ and encrypted and shared with $KMC_1$ when required.

Alternatively the authentication key is re-used and only replaced by $KMC_2$ after confirmation of new key sets when $KMC_1$ and $KMC_2$ replace keys by visiting with a fill gun (e.g. the Quantum fill gun of the applicant's earlier application WO2010/049673) or occasional or regular updates via a moveable key device, for example as described in our application WO2009/141587. In these cases, the downstream security of the communications is reset.

Any further compromise attacks by Mallory must be against every node in the upstream direction towards $KMC_2$ within the second Enclave or sub-network.

$KMC_2$ can generate independent keys so that information is double encrypted. The two KMCs can keep in contact using cross authentication.

In the network 300 of FIG. 3, final node $N_3$ is the end-point and is not connected to a second KMC, for example a home, business unit or desk-top. In these situations the second authentication key can be installed physically using a token or fill gun. This may also be required to provide Access Control to an individual and this key will always be known to the $KMC_1$ and can therefore be easily revoked or updated.

Methods of countering risk of providing useful information in a transmitted bit stream which could be revealed by analysing the bit stream is now described with reference to FIGS. 5 to 7.

Under QKD protocols, one node sends a succession of random or pseudo random bits to another in order to agree a traffic or session key. It is good practise to change this key frequently to restrict the time available to crack the (typically symmetric) key via a brute force 'key exhaustion' attack. This means that in a QKD system, a new key is produced relatively frequently (this may mean once a month, once a day, once an hour, once a minute or in some other timeframe as required having consideration for the desired security of the network and the robustness of the encryption).

As discussed above, only a subset of the transmitted bits will be received due to losses in transmission and the inefficiency in the receiving node itself. Further, as the receiving node make guesses as to in which base the bits have been transmitted, and those for which an incorrect guess is made are not used in key generation, it may not be possible for Mallory to determine which received bits are used. Furthermore, QKD systems often send extra bits so there is a 'throwing away' and/or hashing algorithm employed before bits are selected for key generation. While this uncertainly can add to the security of a DQKD network as outlined above with reference to the bit loss factor, an eavesdropper may nevertheless be able to guess at least some of the bits which have been received by examining the transmitted bit stream.

To give an extreme example of this, it will occur from time to time that a transmitted bit stream will start with a consistent sequence of 1s or 0s, for example 50 1s in a row. In a system with 3 dB losses within a node, it can be assumed with a high degree of certainty that the first bit received and available for use in the key is a 1 (noting, of course, that the bits may not be used in the order they are received). The second bit received and available is very likely also a 1 and so on, with decreasing certainty through the bit stream. Knowing even one received bit and its position in a key generated from the received stream helps significantly to reduce the burden of cryptography in cracking the key—in a brute force attack, each known bit reduces the average time required to break the key by a half. As will be familiar to the skilled person a 128 bit key requires up to $2^{128}$ experiments to exhaustively test the key and therefore be sure of breaking it. If the first 6 bits are known, then only $2^{122}$ experiments are required to exhaustively test the key—this can be done very much faster.

An eavesdropper could therefore elect to wait until a bit stream providing a good indication of at least one of the bits in the key is seen. In one embodiment, the KMC and/or nodes have a pseudorandom number generators (PRNGs), which generates bits from an assigned 'start position' or seed. The seed may be shared between the KMC and a transmitting node. It is assumed that a rogue node cannot change the starting position as that would reveal its presence. The node can however wait until a sequence of bits that allows one or more of the bits used in key generation to be guessed with a reasonable degree of certainty is seen and then start a brute force attack using this information. This attack could be abandoned if a more revealing bit stream was received.

In the example now described, it is assumed that bits are used in the order they are received, but this need not be the case as is explained in greater detail below.

To counter the possible risk that a bit stream may reveal too much key information, a level above which a number of consistent random digits may be set, which may result in an alert being generated, or else key generation would be restarted, or the bit stream could be altered to include a number of bits of opposite polarity. As certainty with which it may be determined that a transmitted bit has been received is dependent on the losses in the system, the number may be selected with a view to what these losses are.

Figure 5:
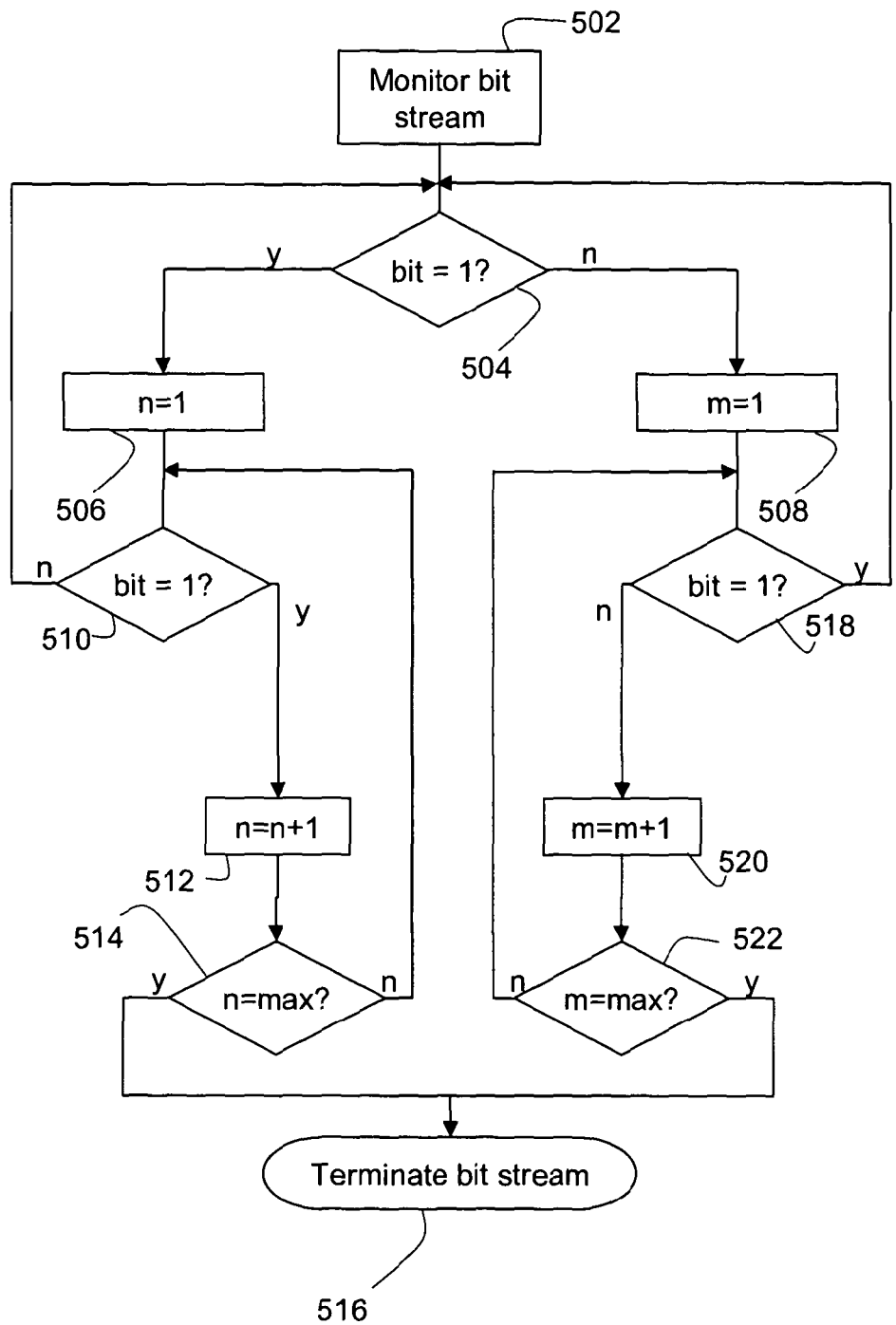
FIG. 5 shows a flowchart of the steps in a method of bit stream analysis.

An example of how this method may be carried out is provided in FIG. 5. FIG. 5 shows a flowchart of steps in a process in which the KMC monitors the bit stream it transmits (step 502). In step 504, the process determines if a first bit is value 1 or a 0. If the bit is a 1, a first counter (n) is started (step 506); if the bit is a 0, a second counter (m) is started (step 508). In step 510, if the first bit was a 1, it is determined if the next bit is a 1, in which case the counter n is incremented (step 512) and a check is carried out as to whether the counter exceeds a predetermined threshold value (step 514). This continues with the counter being incremented with each successive 1 until the threshold value is reached, in which case the bit stream is terminated (step 516) and a fresh key generation effort may be started, or a 0 bit is received, in which case the method restarts with a new first bit. Similarly, in step 518, if the first bit was a 0, it is determined if the next bit is a 0, in which case the counter m is incremented (step 520) and a check is carried out as to whether the counter exceeds a predetermined threshold value (step 522). Again, this continues with the counter being incremented with each successive 0 until the threshold value is reached, in which case the bit stream is terminated (step 516) and a fresh key generation effort may be started, or a 1 bit is received, in which case the method restarts with a new first bit.

Of course, in other embodiments, a single counter arranged to count a string of constant bits may be used.

The permissible length of a bit string including bits of a constant value (i.e. the highest permissible value for n or m) in this example is chosen bearing in mind the losses in the system, and also the level of hashing and/or privacy application which are elements of the bit rate reduction factor. This can then be assessed against the desirability of the information passed through the network, and the length of time for which that data should be protected (in some cases, knowing that the data is secure for seconds or minutes may be sufficient) to determine if the security level provided by these measures is suitable.

In this example, the maximum value of n or m is set with reference to the bit loss factor of the communication. In this example, the maximum value is the inverse of the bit loss factor. For example, if the bit loss factor is $\frac{1}{10}$, then up to 10 bits in a row may be seen before the threshold is breached. In other examples the maximum value may a proportion, e.g. a half, quarter, tenth, etc., of the inverse of the bit loss factor (although it will be appreciated that the choice of proportions is small when the bit loss factor is small, and there may be a minimum to desired value in order to ensure that the bit stream has sufficient entropy).

In practice any information about the bit stream can be used to prioritise the order in which the experiments are carried out. An analysis can be carried out in order to determine an increased likelihood of a certain bit appearing in a certain position, bearing in mind the losses in the system. In some examples, it may be that a bit stream with a high proportion of bits of one value is sent—for example 80% of the first 50 bits have value 1, which might mean it is highly likely that the first few bits received will also have value 1. If an analysis of the bit stream reveals, beyond a threshold level of certainty, more than a threshold number of bits received and their position within a key generated, the system may be arranged to terminate the key agreement process and/or operate on, or 'condition' the transmitted bit stream to reduce the risk of information being revealed.

Figure 6:
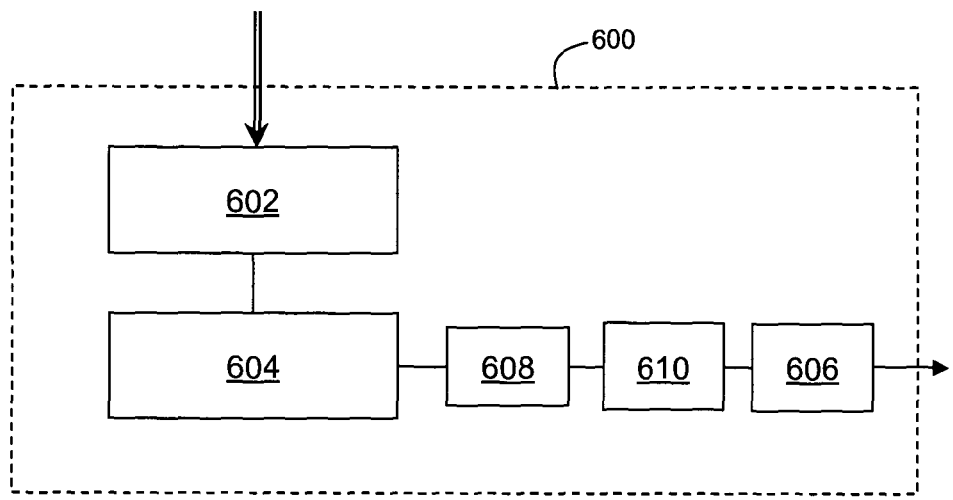
FIG. 6 shows an example of apparatus for use in the method of FIG. 5.
Figure 7:
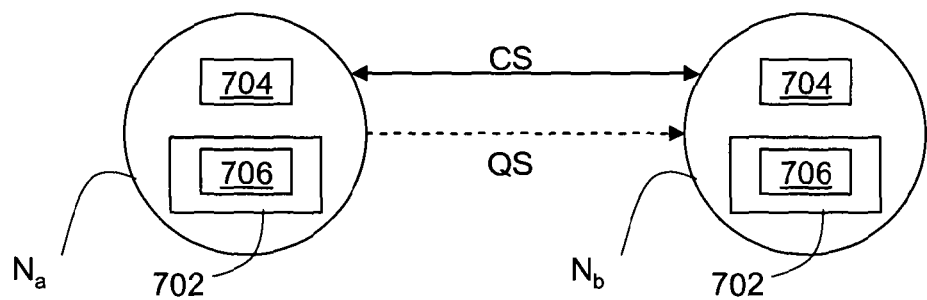
FIG. 7 shows an example of apparatus arranged to determine an order for the use of bits in key generation.

Apparatus for use in such a process is shown in FIG. 6, which comprises a quantum transmitter unit 600 which could be situated in a KMC or any node. The quantum transmitter unit 600 comprises a communication unit, in this example a crypto-unit 602, which encrypts communications before transmitting the encrypted communications via any conventional means, and also receives encrypted communications and decrypts them using a cryptographic key.

The unit further comprises a pseudo random number generator (PRNG) 604. The crypto unit 602 in this example receives seeds for the PRNG 604 from a Key Management Centre, and these are used to generate a string of bits. These bits will be encoded onto photons (or more generally qubits) for transmission over quantum communication media (free space, optical fibres or the like) to a quantum receiver unit (not shown) by the quantum encoder 606.

The quantum transmitter unit 600 further comprises a bit stream analysis unit 608 arranged to operate on the output of the PRNG 604 so as to determine the information that may be obtained from a quantum transmission. In this embodiment, the bit stream analysis unit 608 is arranged to analyse the bit stream output by the PRNG 604 and, if it is determined that an eavesdropper with access to the PRNG output (or the algorithm it uses) could determine an unacceptable degree of information about what bits are received, and therefore which bits may be used in a given position in the key generated therefrom, then the value of one or more bits is changed to the opposite value, i.e. the bit stream is 'conditioned' by a bit stream conditioning unit 610. It will be noted that the bit stream analysis unit 608 and the bit stream conditioning unit 610 act on the output of the PRNG 604 before it is used to encode a quantum signal.

The bit stream analysis unit 608 in this embodiment is arranged to determine condition the bit stream if any of the following are true:
  (i) The first 100 bits are of constant value
  (ii) There is a sequence in the bit stream including more than 200 bits of constant value It will be appreciated that the usefulness of a constant value bit stream decreases the later it is seen in the bit stream. Therefore, the location in the bit stream could be considered. In such examples, the bit stream analysis unit 608 may operate using a function that allows the maximum number of constant bits in a string to increase with the starting position of the constant value bit stream in the string. For example, in one embodiment the maximum length of a constant value bit stream may be less than 90+10i, up to a maximum of 200, where i is the location of the first bit of the run of constant value bits (or more generally, z+yi, where x and y are numbers. In some examples z and/or x may be set with reference to the bit loss factor) in the transmitted bit stream. In this way, a run of 100 would fail the test if the first bit was the start of the run, a run of 110 if the second bit was the first bit of the run, 140 if the fifth bit was the start of the run and so on.

More generally, the bit stream analysis unit 608 is arranged to cause the bit stream conditioning unit 610 to condition the bit stream if it is determined that an attacker may be able to determine, from knowledge of the bit stream transmitted, a number of the bits received by a receiver and their location within a key with a predetermined degree of certainty. Of course, this number and the degree of certainty will depend on the applications for the network and the associated level of security required. For a 128-bit key, for example, it may be acceptable for an attacker to learn the value and location of 6 bits in the key, as a key which is now effectively a 122 bit key may provide an acceptable level of protection for the data being transmitted. In another network, however, carrying more sensitive or valuable data, the acceptable number of bits which can be guessed with a certainty of over 50% may be for example 4 bits.

It will be appreciated that the nodes (and/or KMC) may have equivalent bit stream analysis units 608 and bit stream conditioning units 610. The bit stream conditioning unit 610 will operate on the bit stream according to rules which are shared between the devices. If, for the sake of example, the transmitter unit 600 is a component of a transmitting node and the KMC will agree a key with the receiving node, the bit stream analysis unit 608 in both the KMC and the transmitting node may for example be arranged to monitor the bit stream and, if 100 consecutive bits of value 1 are received, the bit stream conditioning unit 610 acts to replace every $10^{th}$ bit with value 0 before it is encoded as a bit stream. The KMC has its own PRNG, producing the same bit stream from the same seed and will therefore see the same 100 consecutive 1s and will know to replace every $10^{th}$ bit with a 0 when communicating the quantum receiver node to establish a key.

It will also be appreciated by the skilled person that operating on a bit stream in this way decreases the entropy of the string, which in turn provides information to a would-be code breaker. Therefore a balance between maintaining an appropriate level of entropy in the string and preventing the transmission of qubits with revealing characteristics or sub-sequences may be required.

Although the bit stream conditioning unit 610 and the bit stream analysis unit 608 are shown to be components of the transmitter in this embodiment, in other examples they may be part of a PRNG. This may facilitate retrofitting into existing quantum nodes.

As will be familiar to the skilled person, the bits may not be used in the order that they are received. Taking an example where every third bit of the transmitted bit stream is used if successfully received and measured, the receiving unit will have a clock such that it can assign a position to a received bit based on the time at which it is received (methods of synchronising the receiver and the transmitter are known to the skilled person). If the third bit is received and measured in the correct base (as confirmed in the normal key agreement step), this is the first bit used in key generation. Assuming it is not, but the sixth bit is successfully received and measured, this sixth bit will be the first bit used in key generation. In such an example, the consecutive bits which are of interest to the system is the sequence of the third, sixth, ninth, $12^{th}$, etc. This bit sequence should be checked to ensure that it is not made up of consistent is or 0s. Further, it is the run of bits at the beginning of the used sequence which is of most use to a would-be attacker (i.e. the first 100 bits of the example described above is equivalent to every third bit of the first 300 bits in this example).

Of course, the use of every third bit is again purely illustrative and the way in which the bit stream is used may freely predetermined. Indeed, the system described above is unlikely to be used as it is 'wasteful' of bits: other examples might include using every odd bit then every even bit, or every third bit, then the last bit, the penultimate bit the $4^{th}$ from last bit, the $7^{th}$ from last bit, etc. In summary there many possible schemes; however, the example serves to illustrate the principle that it is the sequence of bits that are used, not necessarily the transmitted sequence, which should be analysed.

Therefore, in some embodiments, the bit sequence used may be a secret shared value, and may, for example, be generated using a PRNG and a seed comprising the ID used for authentication. This method could be used in conjunction with or independently from bit stream analysis. Apparatus for use in such an embodiment is now described with reference to FIG. 7. In this example, standard A-to-B, rather than distributed QKD, is described but the skilled person will readily appreciate that the method could equally be applied in a distributed QKD system.

A transmitting node, Alice ($N_a$) transmits a quantum signal QS to a receiving node, Bob ($N_b$). Both Alice and Bob are quantum devices which are also arranged to act as key agreement devices, each comprising a key determination unit 702 and a communication unit 704. In this embodiment, the key determination unit 702 comprises a PRNG 706. The PRNGs are equivalent in the sense that, if they are provided with the same seed, they will produce the same (usually longer) string of bits.

Bob receives a proportion of the transmitted bits and measures them in a random basis before declaring which bits have been received and the bases used for measurement to Alice via their respective communication units 704 using classical communication signals CS. Instead of mutually authenticating as outlined above in relation to FIG. 2 (by preparing cryptographic hashes of the messages using a shared authentication key AY), the shared authentication key is used as the seed in the PRNG 706 to generate a string which is used to determine the order in which receive and correctly measured bits will be used in generating a key therefrom. In this example portions of the generated string to identify each bit in the bit use order (e.g. the first 60 bits output by the PRNG 706 gives the identity of the first bit to use, the second 60 bits gives the identity of the second bit—if a previously used bit is identified subsequently, this result is ignored and the next 60 bits reviewed).

However, other methods of generating or identifying a bit use order will be apparent to the person skilled in the art. For example, there may be a stored set of bit use orders, one of which is identified at random by the output of the PRNG 706. This second method may have advantages as the number of bits required to identify a bit use sequence may be relatively low compared to the first method outlined above, but has the disadvantage that there are a predetermined number of sequences available and, if these become known to an attacker, the attacker could monitor all combinations for a potentially revealing bit stream. This risk can be mitigated by holding a large number of patterns, which decreases the probability that an attacker could succeed. A third method may be to have a predetermined sequence which may be looped, the output of the PRNG 706 being used to identify the starting point in the loop. This also has the advantage of not requiring a large number of bits to identify one of a number of bit use orders. As a result, the second and third method may be particularly suited in embodiments in which the shared authentication key is used to directly identify in which order the bits should be used in key generation, as the number of bits in an authentication key is generally restricted.

Alice and Bob each generate a key and use this to encrypt communications to be sent between to the two. There is no need for a separate authentication process as, if Alice and Bob use different authentication keys, the equivalent PRNGs 706 will output different sequences and bits will be used in a different order resulting in different cryptographic keys. Alice will therefore not be able to successfully decrypt information received which is encrypted with Bob's key and vice versa (although of course in other embodiments, further authentication may take place, particularly if there is a concern that the information received may be decrypted in time, in which case it should be ensured as far as possible that it is sent directly to the correct entity).

In order to implement this method in a DQKD system as described above in particular in relation to FIG. 1, the control node or KMC may be provided with an equivalent PRNG as the receiving node and use the authentication key shared with the receiving node. In that example, two nodes act as quantum devices; one of the nodes and a KMC act as key agreement devices.

Of course, new authentication keys (or other seeds for the PRNG) can be distributed encrypted using the derived key. Alternatively, the authentication key itself or some other shared value may define the order in which the bits are used so no PRNG is necessary.

Any range or device value given herein may be extended or altered without losing the effect sought, as will be apparent to the skilled person for an understanding of the teachings herein.

The invention claimed is:

1. A method of quantum key distribution comprising a quantum exchange step and a subsequent key agreement step, wherein, in the quantum exchange step, a first quantum node and a second quantum node exchange a quantum signal over a first quantum link and wherein the first quantum node communicates with a control node such that the control node has information regarding the quantum signal exchanged in the quantum exchange step, and the control node takes the place of the first quantum node in the key agreement step, the method further comprising determining a bit loss factor corresponding to the ratio between bits exchanged in the quantum signal and the number of bits used, or to be used, in the key agreement step, maintaining a certain level of loss in communications involving any of the first quantum node, the second quantum node and the control node, determining if the bit loss factor meets predetermined security requirements and, if the predetermined security requirements are not met, enhancing the security of the network by at least one of the following: increasing the bit loss factor, hashing the bits used in establishing a key, using an alternative or additional hashing function to increase the bit reduction in hashing, increasing the rate at which keys are replaced, sending portions of random strings for determining keys along different paths, in which the bit loss factor meets predetermined security requirements if the number of possible bit combinations used in key generation exceeds the number of possible keys which may be established in use of the network.

2. A method according to claim 1 which further comprises determining if the bit loss factor meets predetermined security requirements and, if the predetermined requirements are not met, enhancing the security of the network by further providing a plurality of paths through the network.

3. A method according to claim 1 in which the bit loss factor is increased by increasing losses between nodes and/or selecting the efficiency of a node or a component of the network.

4. A quantum key distribution network comprising a control QKD device linked in series via at least two one intermediate QKD devices with an endpoint QKD device, wherein each QKD device has at least one quantum transmitter and/or receiver arranged to exchange a quantum signal with an adjacent QKD device in a quantum exchange step, each intermediate QKD device comprising a communication unit for communicating information regarding the quantum signal exchanged with the adjacent QKD device with a communication unit at the control QKD device and the control QKD device is arranged to agree, in a key agreement step, a quantum key with each QKD device in the series in sequence, wherein the network further comprises a security monitor arranged to determine a bit loss factor corresponding to the ratio between bits exchanged in the quantum signal in at least one quantum exchange step and the number of bits used or to be used in an associated key agreement step, and to determine if the bit loss factor meets predetermined security requirements and, if the predetermined security requirements are not met, to enhance the security of the network by at least one of the following: increasing the bit loss factor, hashing the bits used in establishing a key, increasing the rate at which keys are replaced, sending portions of random strings for determining keys along different paths, and wherein the network is adapted such that a certain level of loss is maintained in communications involving any of the quantum key distribution device, in which the bit loss factor meets predetermined security requirements if the number of possible bit combinations used in key generation exceeds the number of possible keys which may be established in use of the network.

5. A network according to claim 4 in which the security monitor is arranged to determine if the bit loss factor meets predetermined security requirements and, if the predetermined requirements are not met, enhance the security of the network by further providing a plurality of paths through the network.

* * * * *